US009319727B2

(12) United States Patent
Phipps et al.

(10) Patent No.: US 9,319,727 B2
(45) Date of Patent: Apr. 19, 2016

(54) VIEWER-AUTHORED CONTENT ACQUISITION AND MANAGEMENT SYSTEM FOR IN-THE-MOMENT BROADCAST IN CONJUNCTION WITH MEDIA PROGRAMS

(71) Applicant: FOX NETWORKS GROUP, INC., Playa Vista, CA (US)

(72) Inventors: Jason N. Phipps, Los Angeles, CA (US); Sally A. Daws, Encino, CA (US); Stephanie L. Gibbons, West Hollywood, CA (US); Kimberly M. Havens, Santa Monica, CA (US); Megan E. Duffy, Santa Monica, CA (US); Sandeep Motwani, Los Angeles, CA (US); Robert A. Cuadra, Los Angeles, CA (US); Sam M. Applebaum, Marina Del Rey, CA (US); Juni Samos, Los Angeles, CA (US)

(73) Assignee: FX Networks, LLC, Los Angeles, CA (US)

( * ) Notice: Subject to any disclaimer, the term of this patent is extended or adjusted under 35 U.S.C. 154(b) by 0 days.

(21) Appl. No.: 14/527,686

(22) Filed: Oct. 29, 2014

(65) Prior Publication Data

US 2015/0121423 A1    Apr. 30, 2015

Related U.S. Application Data

(60) Provisional application No. 61/897,172, filed on Oct. 29, 2013.

(51) Int. Cl.
*H04N 21/258* (2011.01)
*H04N 21/2665* (2011.01)
(Continued)

(52) U.S. Cl.
CPC ... *H04N 21/25883* (2013.01); *H04N 21/25891* (2013.01); *H04N 21/2665* (2013.01);
(Continued)

(58) Field of Classification Search
CPC . H04N 21/25; H04N 21/254; H04N 21/4756; H04N 21/80; H04N 21/8133; H04N 21/8549; H04N 21/472; H04N 21/4722; H04N 21/25883; H04N 21/235; H04N 21/2365; H04N 21/2665; H04N 21/42684; H04N 21/4622; H04N 21/816; H04N 21/25891; H04N 21/8545
See application file for complete search history.

(56) References Cited

U.S. PATENT DOCUMENTS 6,522,342 B1 * 2/2003 Gagnon et al. ............... 725/38
7,536,320 B2   5/2009 McQueen, III et al.
(Continued)

FOREIGN PATENT DOCUMENTS

AU    2011247050    11/2012
AU    2011308702    4/2013
(Continued)

OTHER PUBLICATIONS

Ashley, David E., "Public as Creator and Infringer: Copyright Law Applied to the Creators of User-Generated Video Content, The", Fordham Intell. Prop. Media & Ent. LJ 20 (2009): 563. http://ir.lawnet.fordham.edu/cgi/viewcontent.cgi?article=1455&context=iplj.
(Continued)

*Primary Examiner* — Randy Flynn
(74) *Attorney, Agent, or Firm* — Gates & Cooper LLP

(57) ABSTRACT

A method, apparatus, and system for providing viewer-derived content for broadcast presentation in conjunction with a broadcast of a media program by a provider of the media program is disclosed. The disclosed system and method (1) simplifies the process for viewers to provide viewer-authored media to broadcasters, while minimizing the data transmission requirements between portable viewer devices and the broadcaster, (2) allows advance approval for the broadcasters to use that viewer-generated content to generate and disseminate viewer-authored-content and (3) provides for management of viewer-generated content (4) integrates with social networks that can be used to at least preliminarily assess the popularity and suitability of the viewer-generated content for broadcast to other viewers.

27 Claims, 31 Drawing Sheets

(51) Int. Cl.
*H04N 21/2743* (2011.01)
*H04N 21/4722* (2011.01)
*H04N 21/482* (2011.01)
*H04N 21/81* (2011.01)
*H04N 21/8545* (2011.01)

(52) U.S. Cl.
CPC ....... *H04N21/2743* (2013.01); *H04N 21/4722* (2013.01); *H04N 21/4825* (2013.01); *H04N 21/8133* (2013.01); *H04N 21/8545* (2013.01)

(56) References Cited

U.S. PATENT DOCUMENTS

| | | | |
|---|---|---|---|
| 7,610,486 | B2 | 10/2009 | Herrmann et al. |
| 7,788,182 | B2 | 8/2010 | Stefik et al. |
| 7,917,371 | B2 | 3/2011 | Jung et al. |
| 8,108,313 | B2 | 1/2012 | Raley et al. |
| 8,200,580 | B1 | 6/2012 | Grinchenko et al. |
| 8,245,269 | B2 | 8/2012 | Schiller |
| 8,442,916 | B2 | 5/2013 | Ta et al. |
| 8,464,304 | B2 | 6/2013 | Harwell et al. |
| 8,533,851 | B2 | 9/2013 | Ginter et al. |
| 2003/0065642 | A1 | 4/2003 | Zee |
| 2003/0177500 | A1* | 9/2003 | Nakamura et al. ............ 725/105 |
| 2003/0233422 | A1 | 12/2003 | Csaszar et al. |
| 2007/0294720 | A1* | 12/2007 | Cohen et al. .................. 725/32 |
| 2008/0114834 | A1 | 5/2008 | Miyazaki et al. |
| 2009/0187936 | A1* | 7/2009 | Parekh et al. ................. 725/25 |
| 2010/0083307 | A1* | 4/2010 | Zalewski ....................... 725/34 |
| 2010/0269144 | A1* | 10/2010 | Forsman et al. ............... 725/92 |
| 2010/0325025 | A1 | 12/2010 | Etchegoyen |
| 2011/0145880 | A1* | 6/2011 | Wang ............................. 725/117 |
| 2011/0202430 | A1 | 8/2011 | Narayanan et al. |
| 2012/0109830 | A1 | 5/2012 | Vogel |
| 2012/0110083 | A1 | 5/2012 | Burritt et al. |
| 2012/0192220 | A1* | 7/2012 | Wyatt et al. ................... 725/30 |
| 2012/0197785 | A1 | 8/2012 | Cooper et al. |
| 2012/0216296 | A1 | 8/2012 | Kidron |
| 2012/0290614 | A1 | 11/2012 | Nandakumar et al. |
| 2012/0311623 | A1* | 12/2012 | Davis et al. ................... 725/18 |
| 2013/0067515 | A1 | 3/2013 | Barish |
| 2013/0074139 | A1 | 3/2013 | Cope et al. |
| 2013/0117692 | A1 | 5/2013 | Padmanabhan et al. |
| 2013/0159412 | A1 | 6/2013 | Robinson et al. |
| 2013/0173482 | A1 | 7/2013 | Twining et al. |

FOREIGN PATENT DOCUMENTS

| | | |
|---|---|---|
| CA | 2753642 | 2/2012 |
| WO | 2011135379 | 11/2011 |
| WO | 2012044845 | 4/2012 |

OTHER PUBLICATIONS

Cesar, et al., "An architecture for end-user TV content enrichment", 2006. http://citeseerx.ist.psu.edu/viewdoc/download?doi=10.1.1.110.6029&rep=rep1&type=pdf.

Lee, E., "Warming up to user-generated content", University of Illinois Law Review 2008: 1459. http://illinoislawreview.org/wp-content/ilr-content/articles/2008/5/Lee.pdf.

\* cited by examiner

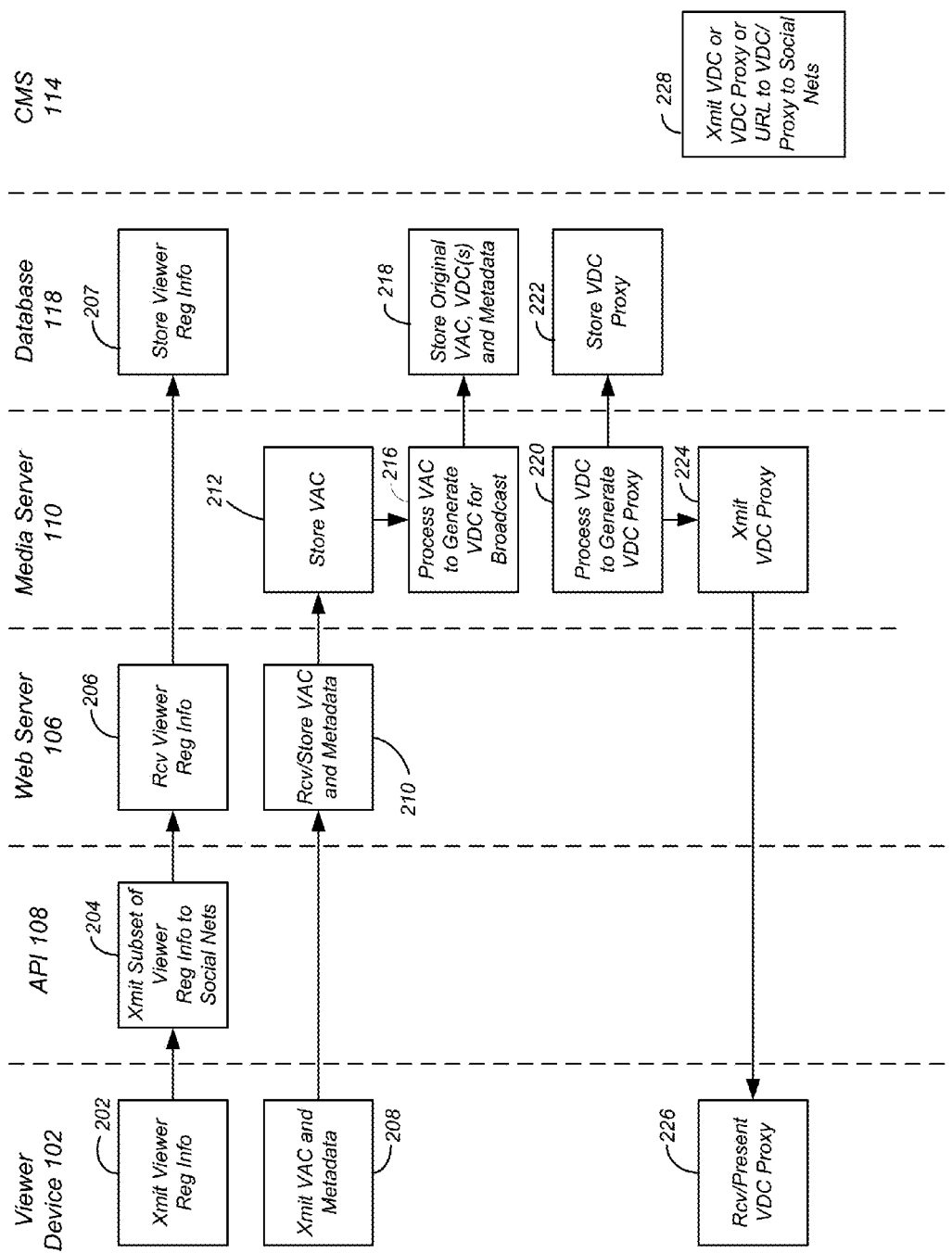

| Viewer | On Air | Abuse | Attribute Active? | Featured? | Ban? | D/L? |
|---|---|---|---|---|---|---|
| Post | 1/0 | N | 1/0 | 1/0 | 1/0 | 1/0 |
| ... | ... | ... | ... | ... | ... | ... |
| Comment | 1/0 | N | ... | 1/0 | 1/0 | ... |
| Post | ... | ... | ... | ... | ... | ... |
| ... | ... | ... | ... | ... | ... | ... |

FIG. 25

App Users ⎯⎯⎯ 2602A
Posts ⎯⎯⎯⎯⎯⎯ 2602B
On-Air Submissions ⎯⎯ 2602C
Abusive Posts ⎯⎯⎯ 2602D
Abusive Comm ⎯⎯ 2602E
FAQ ⎯ 2602F

| USERNAME | CREATED | FEATURED | SOURCE |
|---|---|---|---|
| CHAR (2604) | FROM / TO (2606) | YES/NO (2608) | |
| BOOM | 1/4/2014 | N | SELECT |
| COOL-A-COO | 9/3/2013 | Y | SELECT |
| KATHYS | 4/12/2013 | N | SELECT |
| ... | | | |
| JINKSTER | 4/3/2014 | N | SELECT |

App Users ———— 2602A
Posts ———— 2602B
On-Air Submissions ———— 2602C
Abusive Posts ———— 2602D
Abusive Comm ———— 2602E
FAQ ———— 2602F

| HASHTAG 2611 | POPULARITY 2612 | FAVORITES 2614 | USERNAME 2616 | FEATURED 2618 | CREATED 2620 |
|---|---|---|---|---|---|
| CHAR 2634 | MAX / MIN 2636 | MAX / MIN 2638 | CHAR 2640 | YES/NO 2642 | FROM / TO 2644 |
| THUMB IMAGE 2622 | -1 2624 | 0 2626 | BOOM 2628 | N 2630 | 5/28/2014 2632 |
| THUMB IMAGE | 5716 | 4 | COOL-A-COO | Y | 1/31/2014 |
| THUMB IMAGE | -4 | 0 | BOOM | N | 4/28/14 |
| ... | | | | | |
| THUMB IMAGE | 6 | 1 | KATYS | N | 2/14/14 |

*FIG. 26B*

```
┌─────────────────────────────────────────────────────────────────┐   2702
│  PROVIDE AN APPLICATION FOR INSTALLATION ON A VIEWER DEVICE, THE│
│  APPLICATION FOR GENERATING VIEWER-AUTHORED CONTENT FROM A      │
│                      PLURALITY OF IMAGES                        │
└─────────────────────────────────────────────────────────────────┘
                                 ▼
┌─────────────────────────────────────────────────────────────────┐   2704
│  RECEIVING VIEWER REGISTRATION INFORMATION UNIQUELY ASSOCIATED  │
│   WITH A VIEWER VIA THE INSTALLED APPLICATION FROM THE VIEWER   │
│      DEVICE, THE APPLICATION FOR COLLECTING VIEWER REGISTRATION │
│      INFORMATION, VIEWER AUTHORED MEDIA, AND VIEWER AUTHORED    │
│                         MEDIA METADTA                           │
└─────────────────────────────────────────────────────────────────┘
                                 ▼
┌─────────────────────────────────────────────────────────────────┐
│ DURING OR TEMPORALLY PROXIMATE THE LIVE BROADCAST OF THE MEDIA  │
│    PROGRAM, RECEIVING THE VIEWER-AUTHORED CONTENT FROM THE      │
│   VIEWER DEVICE FOR CONSIDERATION BY THE PROVIDER OF THE MEDIA  │   2706
│      PROGRAM FOR PRESENTATION IN CONJUNCTION WITH THE LIVE      │
│  BROADCAST OF THE MEDIA PROGRAM, THE VIEWER AUTHORED CONTENT    │
│    GENERATED BY THE INSTALLED APPLICATION FROM THE PLURALITY OF │
│  IMAGES, AND INCLUDING FIRST INFORMATION ASSOCIATING THE VIEWER-│
│     AUTHORED CONTENT WITH THE IDENTIFIED VIEWER AND SECOND      │
│ INFORMATION PRE-APPROVING USE OF THE VIEWER-AUTHORED CONTENT    │
│    FROM THE VIEWER DEVICE FOR PRESENTATION IN CONJUNCTION WITH  │
│              THE LIVE BROADCAST OF THE MEDIA PROGRAM            │
└─────────────────────────────────────────────────────────────────┘
                                 ▼                                   2708
┌─────────────────────────────────────────────────────────────────┐
│    RECEIVING THE VIEWER-AUTHORED CONTENT FROM THE VIEWER DEVICE │
│                    IN A CONTENT MANAGEMENT SYSTEM               │
└─────────────────────────────────────────────────────────────────┘
                                 ▼                                   2710
┌─────────────────────────────────────────────────────────────────┐
│         QUEUING THE VIEWER-AUTHORED CONTENT WITH OTHER VIEWER-  │
│   AUTHORED CONTENT FROM OTHER VIEWERS FOR CONSIDERATION FOR     │
│      THE BROADCAST PRESENTATION IN CONJUNCTION WITH THE LIVE    │
│                     BROADCAST OF THE MEDIA PROGRAM              │
└─────────────────────────────────────────────────────────────────┘
                                 ▼                                   2712
┌─────────────────────────────────────────────────────────────────┐
│       DETERMINING IF THE VIEWER-AUTHORED CONTENT COMPLIES WITH  │
│                        BROADCAST REGULATIONS;                   │
└─────────────────────────────────────────────────────────────────┘
                                 ▼                                   2714
┌─────────────────────────────────────────────────────────────────┐
│      SELECTING THE VIEWER-AUTHORED CONTENT FOR BROADCAST        │
│    PRESENTATION IN CONJUNCTION WITH THE LIVE BROADCAST OF THE   │
│                           MEDIA PROGRAM                         │
└─────────────────────────────────────────────────────────────────┘
                                 ▼                                   2716
┌─────────────────────────────────────────────────────────────────┐
│  BROADCASTING THE VIEWER-AUTHORED CONTENT IN CONJUNCTION WITH   │
│              THE LIVE BROADCAST OF THE MEDIA PROGRAM            │
└─────────────────────────────────────────────────────────────────┘
```

VIEWER-AUTHORED CONTENT ACQUISITION AND MANAGEMENT SYSTEM FOR IN-THE-MOMENT BROADCAST IN CONJUNCTION WITH MEDIA PROGRAMS

CROSS-REFERENCE TO RELATED APPLICATIONS

This application claims benefit of U.S. Provisional Patent Application No. 61/897,172, entitled "VIEWER-AUTHORED CONTENT ACQUISITION AND MANAGEMENT SYSTEM FOR IN-THE-MOMENT BROADCAST IN CONJUNCTION WITH MEDIA PROGRAMS," by Jason N. Phipps and Sally A. Daws, filed Oct. 29, 2013, which application is hereby incorporated by reference herein.

BACKGROUND OF THE INVENTION

1. Field of the Invention

The present invention relates to systems and methods for communicating media programs and the promotion thereof, and specifically for a method and apparatus for acquiring viewer-authored media, managing and rebroadcasting viewer-authored content generated from the viewer-authored media.

2. Description of the Related Art

Currently, media program providers typically scour the Internet to find viewer-authored media such as video, mimes, JPEGs (joint Photographic Experts Group) and GIFs (Graphical Interchange Format) and the like for viewer-generated content that might be useful for purposes of generating further interest in the media program among other viewers. After such viewer-generated content is discovered, the media program provider or their agents must track down the source of the viewer-generated content, confirm authorship and the right to convey rights to the viewer-generated content, and negotiate for the acquisition of such rights. All of these steps must be performed before the viewer-generated content may be copied or used in a way that implicates the owners copyrights to the viewer-generated content.

The problem with such as system is that (1) the process itself is expensive to implement (2) reproduction rights negotiated after the media program provider has expressed interest, rather than before, hence the reproduction rights can come at an artificially inflated price, (3) the process is time consuming to the point where many of the intended audience of the viewer-generated content have already experienced it, whether on the web or a social network, thus diluting its value. Accordingly, the media program provider appears to be a "me too" participant in the viewer generated content, rather than actively involved in its discovery and enjoyment, as other viewers. It also makes it more difficult for the media program provider to "brand" the viewer-generated content as being sponsored by or sourced by the media program provider, thus diluting the value of the content itself.

Further, the generation and transmission of viewer-generated media from viewer devices to the media program provider and the transmission of content generated from the viewer-generated media and back to the viewer devices can be throughput intensive. Although many viewers may wish to submit such viewer-generated content using portable devices such as smartphones, such devices typically communicate over third generation (3G) or fourth generation (4G) mobile data telecommunication networks. Such networks have limited bandwidth and viewers are typically charged for exceeding their allocated data transfer allotment for the billing period.

Further, it can be difficult for broadcasters to judge the potential popularity of viewer-generated content, especially in circumstances when the broadcaster is receiving large volumes of viewer-generated content from a large number of viewers. At the same time, the broadcaster must assure that the viewer-generated content will not offend a significant number of viewers or run askance of laws governing the suitability of content for broadcast (e.g. Federal Communications Commission rules against the broadcast of obscene or indecent programming or programming including profane language at specific times of the day.

U.S. Pat. No. 8,464,304, issued to Harwell, et al. on Jun. 11, 2013 discloses a system for receiving and distributing user-generated video content. The system receives video data from a client computing device, where the video data is captured using a camera connected to the client computing device in accordance with instructions executed on the client computing device to provide the video data in accordance with predetermined constraints. The video data is automatically transcoded into at least one different format based on user credentials associated with a user of the client computing device and/or attributes associated with the video data. At least one format of the transcoded video data defines a video file in a format appropriate for inclusion in a linear television programming transmission, and the transcoded video data is uploaded to a server for distribution. However, the Harwell system cannot support the transmission of such processed video data to other users in near real time.

What is needed is a system and method for in-the-moment acquisition, management, of viewer-authored content and dissemination of viewer-authored media generated from the viewer-authored content relevant to the demographic watching those media programs. The system and methods described below satisfy these needs. The disclosed system and method (1) simplifies the process for viewers to provide viewer-authored media to broadcasters, while minimizing the data transmission requirements between portable viewer devices and the broadcaster, (2) allows advance approval for the broadcasters to use that viewer-generated content to generate and disseminate viewer-authored-content and (3) provides for management of viewer-generated content (4) integrates with social networks that can be used to at least preliminarily assess the popularity and suitability of the viewer-generated content for broadcast to other viewers.

SUMMARY OF THE INVENTION

To address the requirements described above, the present invention discloses a method, apparatus, and system for providing viewer-derived content for broadcast presentation in conjunction with a broadcast of a media program by a provider of the media program. In one embodiment, the method comprises receiving viewer registration information uniquely associated with a viewer via an application executing on a viewer device, the application for collecting the viewer registration information, viewer-authored content and viewer-authored content metadata associated with the viewer-authored content receiving the viewer-authored content and the viewer-authored content metadata in a content management system processing the viewer authored content according to the viewer authored metadata to generate the viewer-derived content, queuing the viewer-derived content with other viewer-derived content generated from viewer-authored content from other viewers for consideration for the broadcast presentation in conjunction with the broadcast of the media program, determining if the viewer-derived content complies with broadcast regulations or quality standards, selecting the viewer-derived content for broadcast presentation in conjunction with the live broadcast of the media program if the viewer-derived content complies with the broadcast regulations or the quality standards, and providing the viewer-derived content for broadcast in conjunction with the live broadcast of the media program.

In another embodiment, an apparatus comprises a processor, and a memory coupled to the processor, wherein the memory storing a plurality of instructions comprising instructions for performing the above operations.

In still another embodiment, a system comprises a viewer device, comprising a viewer device processor and a viewer device memory, communicatively coupled to the processor, and also comprises a viewer authored content acquisition and management system (VACAMS) that comprises a VACAMS processor, a VACAMS memory, coupled to the VACAMS processor, the memory storing a plurality of instructions comprising instructions for performing the above operations.

BRIEF DESCRIPTION OF THE DRAWINGS

Referring now to the drawings in which like reference numbers represent corresponding parts throughout:

FIGS. 2A-2B are diagrams illustrating exemplary process steps that can be used in connection with the VACAMS;

FIG. 25 is a visual representation of the CMS management data stored in the database;

FIGS. 26A-26C are diagrams of an exemplary user interface implemented by the API;

FIG. 27 is a diagram illustrating exemplary steps that can be used to automatically collect, manage, and provide viewer-authored media content for consideration for broadcast presentation in conjunction with a live broadcast of a media program.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
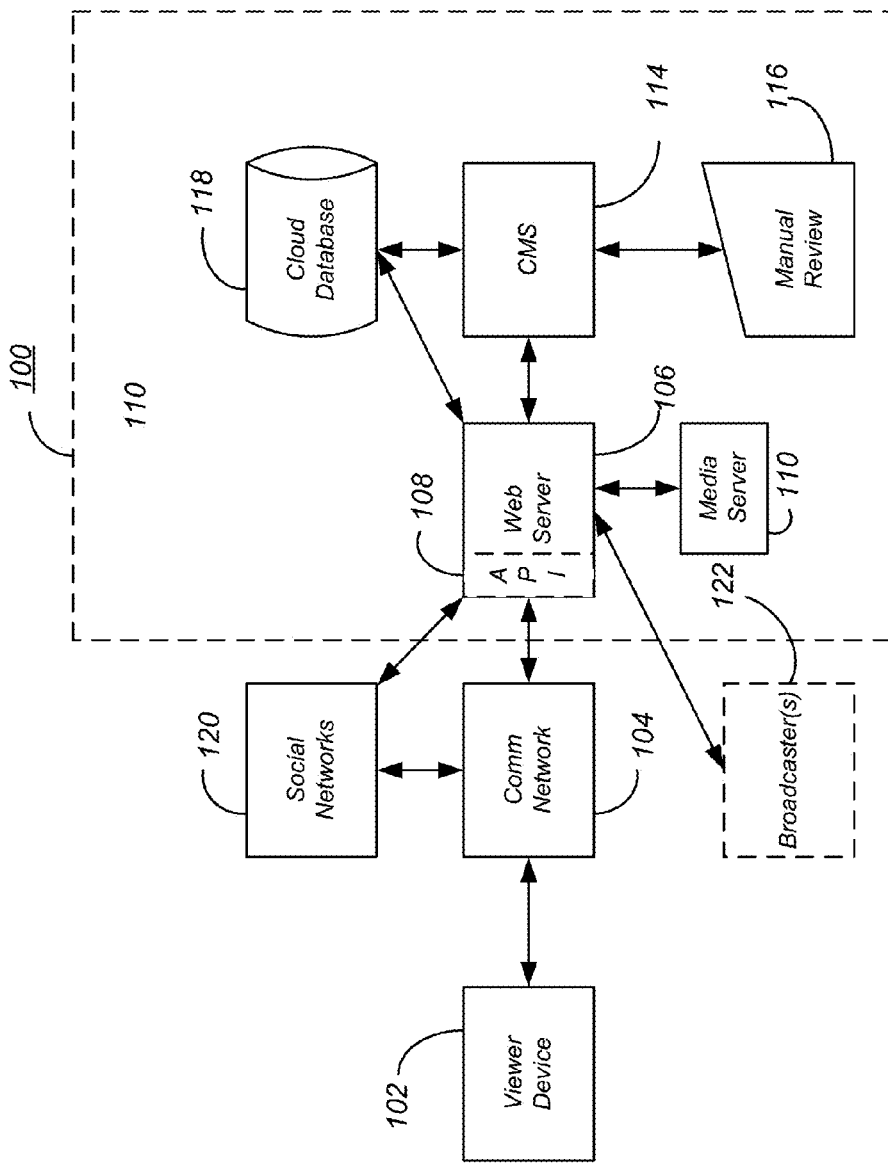
FIG. 1 is a diagram of a viewer-authored content acquisition and management system (VACAMS)

FIG. 1 is a diagram of a viewer-authored content acquisition and management system (VACAMS) 100. The VACAMS 100 accepts data such as viewer-authored content (VAC) from devices 102 such as mobile devices 102A and desk/laptop devices 102B, converts the VAC to viewer-derived content (VDC) and provides that VDC for distribution to other users by analogous applications running on other users' devices 102 and through broadcast, typically in conjunction with the media program related to the viewer-authored content. Communications between the device 102 and the VACAM 100 is provided by communication network 104, which may comprise the Internet, a 3G, 4G or LTE mobile network, or any other communication means of suitable throughput and latency.

The VACAMS 100 also comprises a server 106 such as a cloud web server, which accepts information from the device 102 via the communications network 104, and provides that information to other elements of the VACAMS 100, including the content management system (CMS) 114 and cloud database 118. The CMS 114 manages the data received from viewers, which include VAC such as videos, PNGs, GIFs, JPEGs, as well as text.

The CMS 114 is used to determine which of the VDC generated from the VDC is provided to the broadcaster 122 for rebroadcast or transmitted to other viewer devices for display to other viewers via the server 106. Such determinations are recorded in database 118.

The CMS 114 can automatically perform many of the management functions, allowing submitted VAC to be rapidly accepted, analyzed, filtered, vetted, and rebroadcast. Typically however, the ultimate vetting or selection of VDC for use in conjunction with a concurrent on-air broadcast is performed by manual review of VAC or VDC generated from the VAC, for example, by manual (e.g. human-in-the-loop) review processes 116 using the CMS 114. Such operations can comprise, for example, a staff with expertise in digital on-air production, selecting content and making it available to produce on-air advertisements or enhancements to the on-air program and/or related social network.

The rapidity with which the VDC can be generated from the VAC, processed and rebroadcast is an important capability of the VACAMS 100, as this rapidity provides a paradigm shift in the use of such VAC by providing "in the moment" promotion about the shows or media programs associated with the VAC, and promotions that are well branded for the targeted demographic of viewers that watch the show. The VACAMS 100 also automatically accepts information regarding VDC from other viewers that can be used in rapidly determining whether the VDC is suitable for broadcast by the broadcaster 122 or sharing via social networks 120 and the like.

Figure 2B:
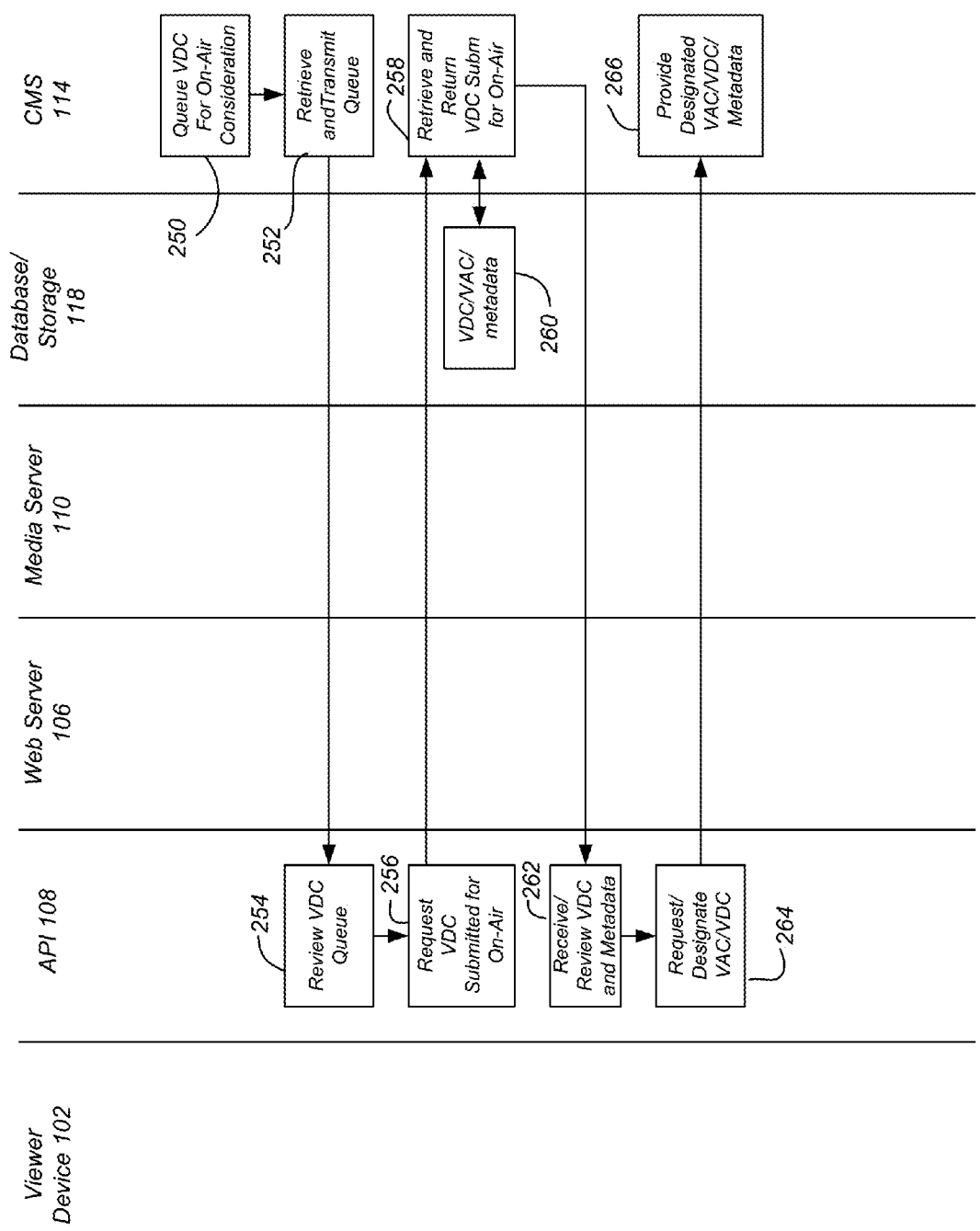

FIGS. 2A-2B are diagrams illustrating exemplary process steps that can be used in connection with the VACAMS 100. Blocks 202-206 describe the viewer registration process. In block 202, the device 102 transmits viewer registration information.

Figure 3:
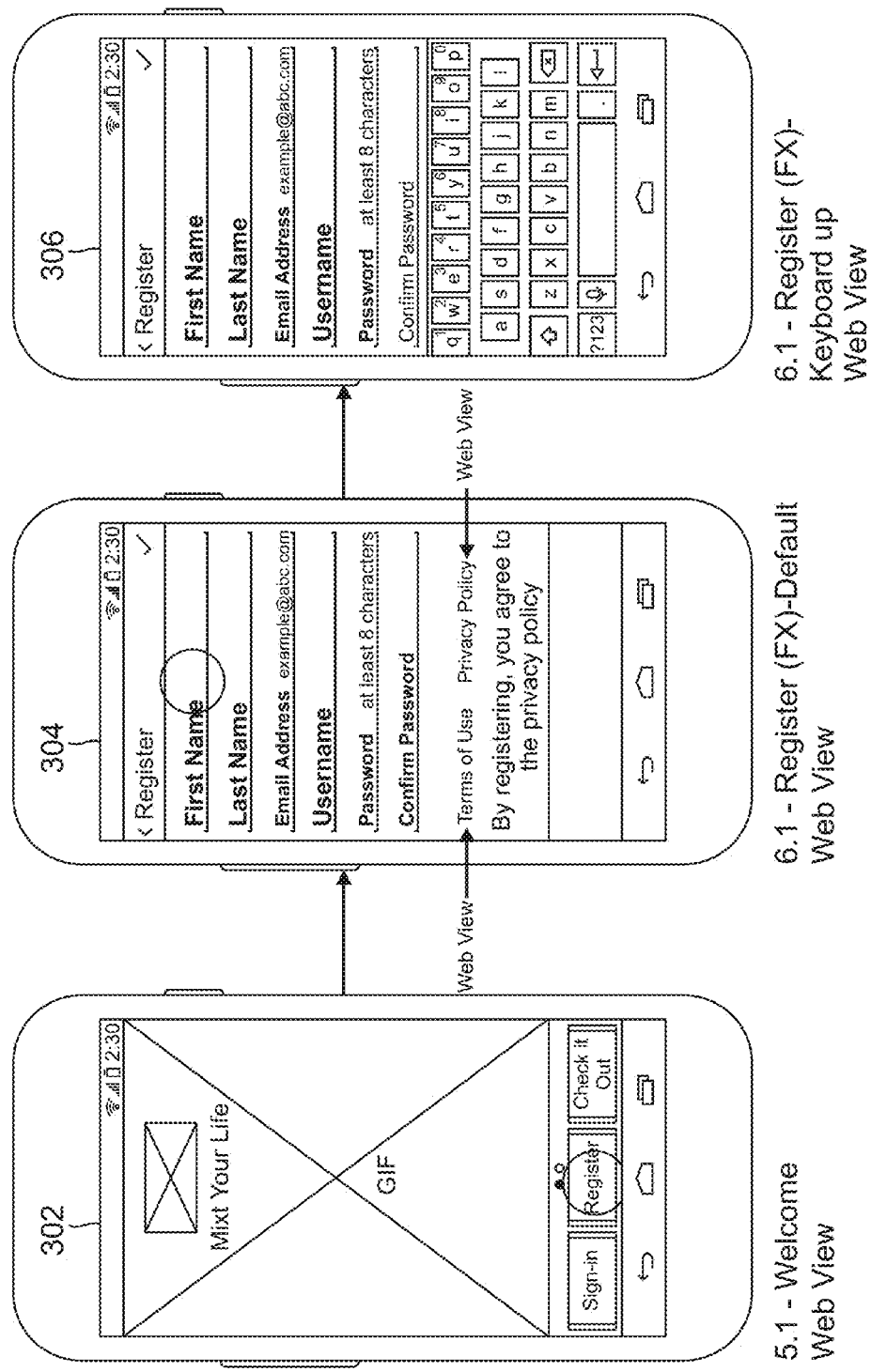
FIG. 3 is a diagram illustrating the registration process.

FIG. 3 is a diagram illustrating the registration process. FX is a registered trademark of Twentieth Century Fox Film Corporation. Welcome screen 302 is shown when the viewer executes the related application program using the device 102. In the illustrated embodiment, the device 102 is a mobile device such as a smartphone, but can be any processing device capable of accepting and providing the information described herein.

The welcome screen 302 includes three viewer-selectable controls, including a first control 304 for a registered viewer to sign in to the VACAMS 100 system, a second control 306 for an unregistered viewer to register with the VACAMS 100 system, and a third control 308 to allow the viewer to preview trending VDC submitted by other viewers and accepted and provided for broadcast or other transmission by the VACAMS 100.

From welcome screen 302, the user may select the register control 306, and a registration screen 304 is presented. At this point, the user uses the keyboard interface shown in screen 406 to enter user information, and transmits that information to the VACAMS 100 for storage in the database 118. Registration screen 402 includes input fields for the viewer to enter their name, email address, desired user name, password, and password confirmation, using, for example, the alphanumeric interface shown in screen 304. Screen 304 further includes a "terms of use" and "privacy policy" control that retrieves from the VACAMS 100 the terms of the viewer's use of the VACAMS 100 system and the privacy policy. This information may be pre-stored in the device or included in the application, or may be retrieved from the VACAMS 100 via the communication network 104. This permits the viewer to obtain the latest updates regarding terms of use and privacy policy, for example, to account for expanded or different terms of use that change with time or for viewers who have submitted VAC.

Returning to FIG. 2A, block 203 transmits at least a subset of the viewer registration information to social networks such as FACEBOOK and TWITTER using APIs provided by those social networks and executing on the device 102, or using a native API implemented by the media sharing application executing on the device 102. In one embodiment, only a subset of such data is provided, so as to be consistent with the user's privacy preferences privacy-related legal requirements. Alternatively, the viewer registration information can be provided to the VACAMS 100 and forwarded to the social network.

Block 206 receives the viewer information in the web server 106, and stores it in the database 118, as illustrated in block 207.

Once the viewer has registered for the first time or a pre-registered viewer has signed, in, they may be presented with a main menu screen 504 or a feed screen 502, as further discussed in connection with FIG. 5 below.

Figure 4:
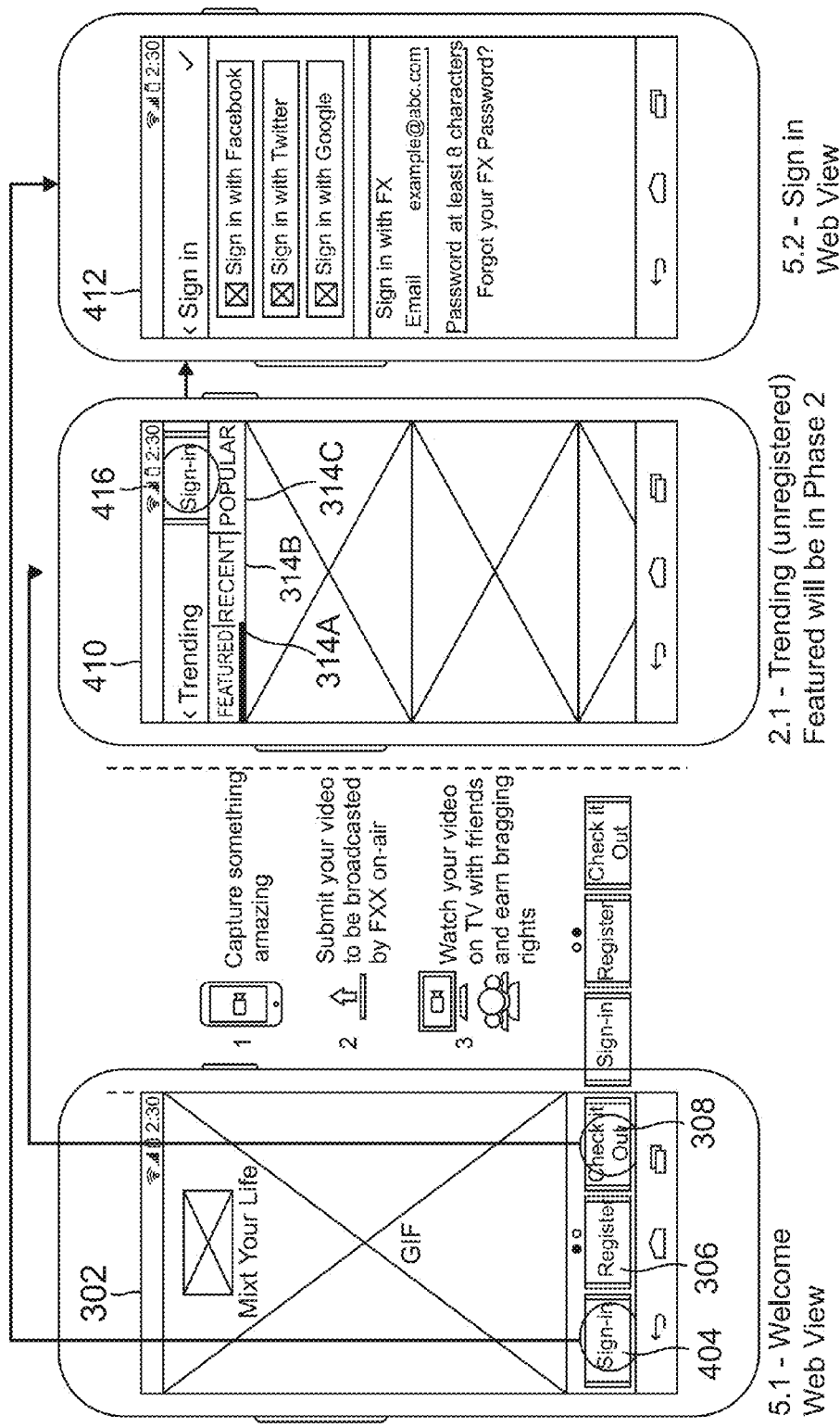
FIG. 4 is a diagram of one embodiment of a device interface used for registered users to sign in to the service or for unregistered users to preview the service.

FIG. 4 is a diagram of one embodiment of a device 102 interface used for registered users to sign in to the service or for unregistered users to preview the service. Selection of control 404 causes a processor executing application instructions stored in a memory of the device 102 to display sign in screen 412. Sign in screen 412 allows the user to sign in with social networking accounts such as a GOOGLE+-FACEBOOK or TWITTER, or to sign into the VACAMS 100 service by providing an email and password provided by the same viewer when registering with the VACAMS 100 service. At this point, the user may enter an email address using the interface provided by the device 102 as well as a password, and this information is transmitted to the VACAMS 100 via the communications network 104. The information is provided from the server 106 to the CMS 114, and if the email address and password combination compare favorably with registration information stored in database 118, the user may transmit information presenting the main menu or feed interface described herein with respect to FIG. 5.

If the user selects control 308, a message is transmitted to the VACAMS 100 indicating that an unregistered user has requested to view a general "trending" screen 310 showing VDC generated from VAC submitted by other viewers that the CMS 114 of the VACAMS 100 has selected for presentation in the trending feed. The VACAMS 100 responds by sending a "trending feed" to the device 102. The device 102 receives the trending feed and reproduces the media of the trending feed on the display of the device 102. In the illustrated embodiment, the trending feed can show media that is featured (selected by the VACAMS 100, recently made available, or popular (e.g. viewer feedback via the one or more social networks 120 via controls 314A, 314B, and 314C respectively). A registered viewer that has not yet signed in may also elect to do so from screen 410 as well, using control 416.

The trending feed typically includes VDC (derived from the VAC of other users), but may include other content as well. In one embodiment, this "trending" feed for an as yet unregistered user differs from the "trending" feed provided to a registered user, in that the "trending" feed can be customized according to registered user requirements (for example, by customizing the feed to show content derived from content authored by other viewers "followed" by the viewer) or by affinity (other viewers receiving positive feedback . . . for example, "likes" from the registered viewer or other registered viewers for the content they submitted), while the "trending" feed for unregistered users cannot do so because the demographic of the user is unavailable. The "trending" feed for registered users may also be customized to change the way in which the data is presented. Further, the presentation of trending viewer provided content can be limited to featured viewer provided content (selected by the CMS 114) using control 314A, recent viewer provided content using control 314B, or popular content (liked by the greatest number in the social network) by selection of control 314C.

Figure 5:
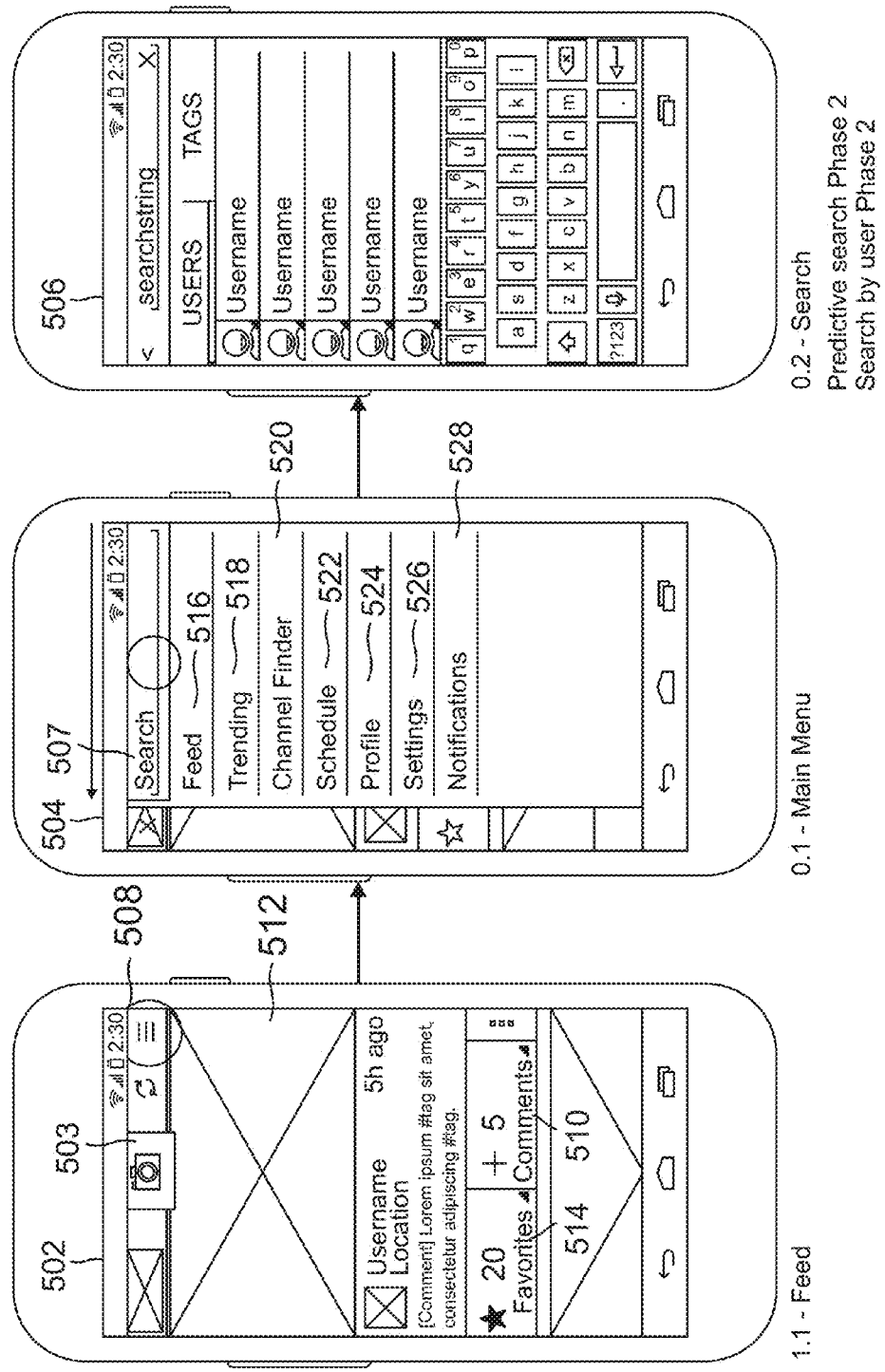
FIG. 5 is a diagram illustrating a feed screen, a main menu screen, and a search screen.

FIG. 5 is a diagram illustrating a feed screen 502, a main menu screen 504, and a search screen 506. The feed screen 502 may include a number of images from VAC from other viewers or VDC derived therefrom, and text describing the username of each other viewer providing the associated VAC/VDC, as well as comments from still other viewers. Also offered is a control 510 indicating the number of comments about the VDC presented in feed window 512, and a favorites control 514. Also included is a main menu control 508 that, when selected, presents the main menu screen 504. The main menu screen 504 includes a feed control 516 returning the user to the feed screen 502, trending control 518 which navigates the user to the trending screen 410, channel finder control 520 which is used in finding broadcast channels related to the media program (as shown in screen 1804 shown in FIG. 18), schedule control 522, profile control 524 for presenting the user's profile as shown herein on screen 1302, settings control 526 (for changing the settings of the application, for example, using settings screen 2002), and a notifications control 528 (for controlling the circumstances in which the user is notified of events using the application executing on the mobile device 102, for example, by use of screen 2202.

Selection of the search control 507 allows the user to enter a keyword search to search for VAC/VDC from other viewers using the metadata such users provided with their VAC, or to search for other users, with the results presented in presents the search result screen 506. The viewer may enter alphanumeric data in the device 102 using a suitable interface, and this data is transmitted to the VACAMS 100. The VACAMS 100 searches the database 118 for information complying with the alphanumeric data and transmits the information to the device 102 for display. In one embodiment, a predictive search is utilized wherein the search results are updated with each character entered, according to previous searches by the viewer. Using this interface and method, the viewer can search for hash tags associated with content, other viewers, or other suitable subject, or a keyword search for any feed notifications.

Figure 6:
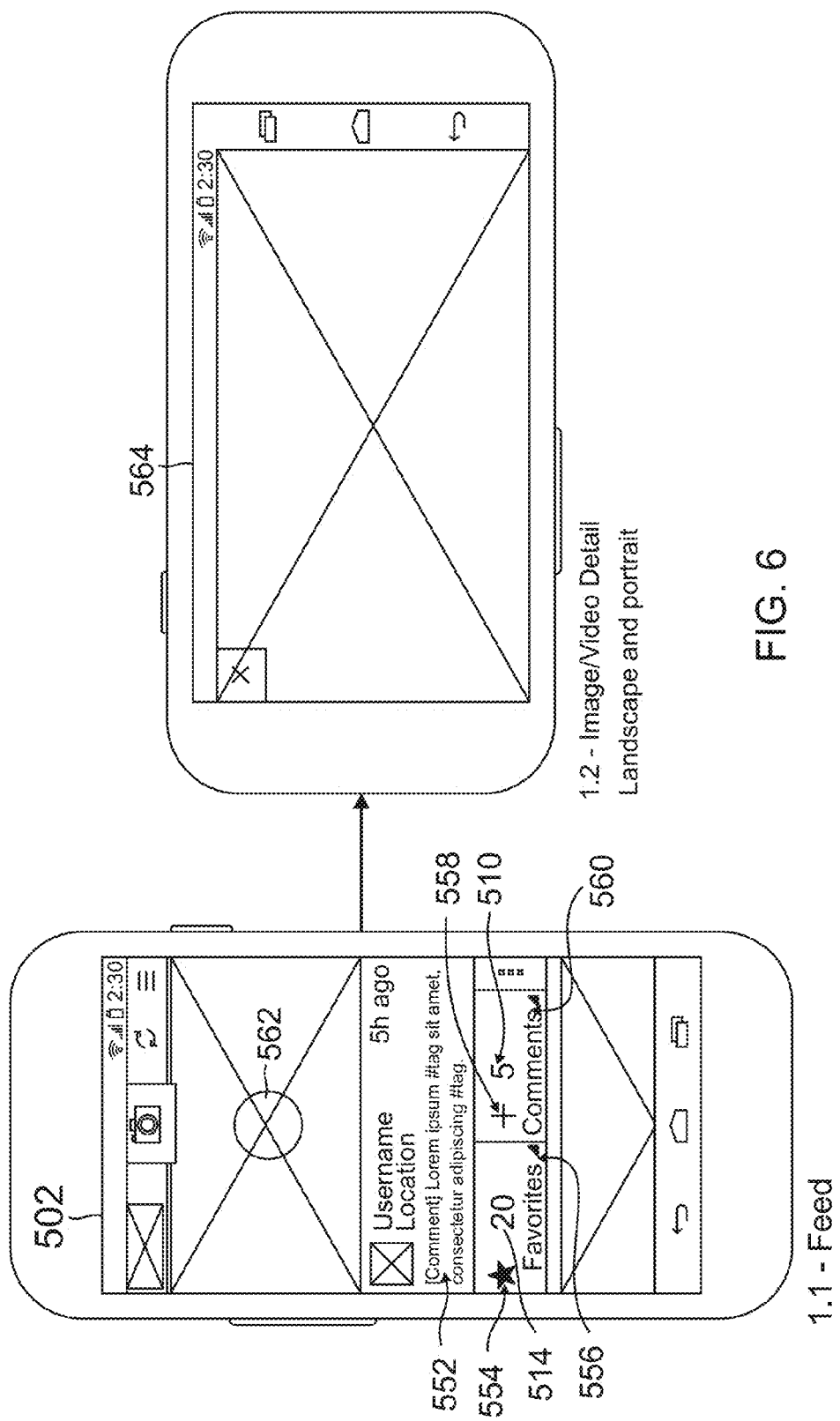
FIG. 6 is a diagram showing further details of the feed screen.

FIG. 6 is a diagram showing further details of the feed screen 502. As illustrated, if the VDC presented in the feed screen does not have any comments, the area 552 associated with the VDC and username is collapsed. The comment control 510 indicates how many comments have been made by other viewers to the VDC. Tapping one portion of the control (e.g. the small arrow 560 in the lower right corner of the control) transmits a message to the VACAMS 100 to retrieve the comments associated with the currently presented VDC. The VACAMS 100 responds with the information, which is thereafter processed by the device 102 and presented as described further below. If the user would like to add a comment to the currently presented VDC, another portion 558 of the comment control (e.g. the portion associated with the "+") is tapped, and the user can thereafter enter a comment into the device 102 and submit it to the VACAMS 100 for consideration. The viewer may add the VDC shown in window 562 or the viewer who provided the VAC used to generate the currently presented VDC to a list of favorites, by selecting the star portion 554 of the favorites (or likes) control 514. The number of other users for which the concurrently presented VDC shown in window 562 is a "favorite" is shown on the favorites control (in the illustrated example, 20 other viewers have done so), and selecting (tapping) the down-rightward arrow 560 of this portion of the control transmits a message from the device 102 to the VACAMS 100 to show those other viewers "favoriting" the VDC, as illustrated further in screen 702 of FIG. 7 and discussed further below. Also, selecting the window portion of the touch screen presenting the VDC itself 562, may present the VDC in a larger screen, as shown in screen 564.

Figure 7:
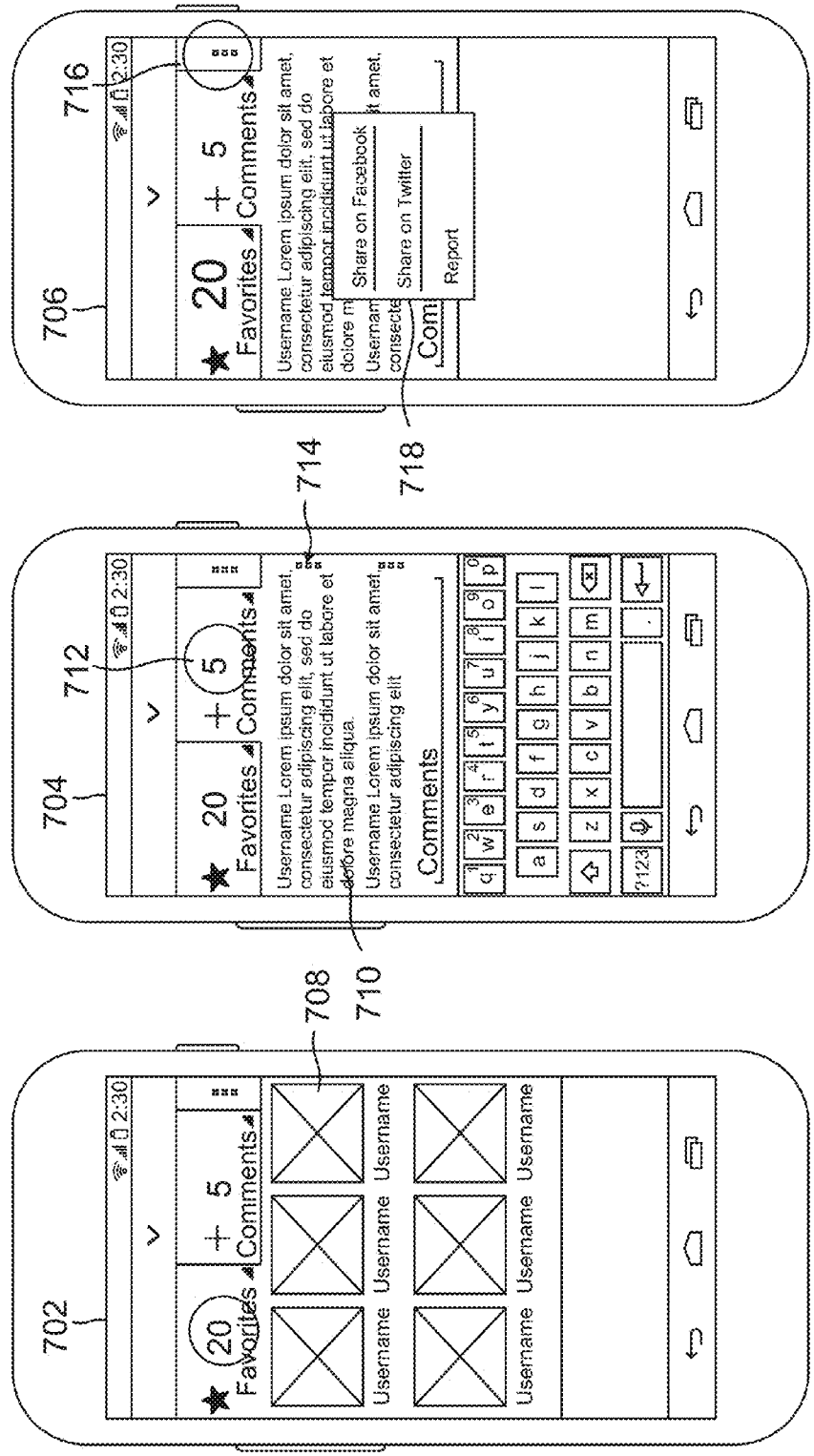
FIG. 7 illustrates an expanded version of feed screen that is displayed when the user taps a favorites control.

FIG. 7 illustrates an expanded version of feed screen 702 that is displayed when the user taps the down-rightward arrow 560 on the favorites control 514. FACEBOOK is a registered trademark of FACEBOOK, Inc. and TWITTER is a registered trademark of TWITTER, Inc. This displays the viewers that have "favorited" the associated VDC. As illustrated, the screen 702 presents an image (e.g. image 708) corresponding to each viewer that has favorite the associated content.

FIG. 7 also shows an expanded version of a feed screen 704 that adds a comments screen portion 710 that may be shown when the viewer selects the comments control 712 to add a comment. As illustrated, the screen 704 shows the previous comments made to the VDC, and the viewer can add new comments by selecting the appropriate alphanumeric characters.

FIG. 7 also illustrates the use of a social network control 714 (shown as ellipses). Selection of this control 714 opens a control box that allows the viewer to share their comment on a social network such as FACEBOOK or TWITTER, or to report the VDC as being inappropriate. Screen 706 illustrates that selection of control 716 (which is associated with the VDM presented in window 512) opens control box 718, which allows the user to take the above identified actions. Selection of control 714 allows the user to share or report comments presented in screen portion 710.

If the VAC or VDC is to be shared on a social network, the information indicating as such is transmitted to the VACAMS 100, which transmits the appropriate information to the selected social network 120 as shown in FIG. 1. If the VDC generated from the VAC is to be reported as inappropriate, information indicating as such is transmitted to the VACAMS 100, where it is accepted and entered by the CMS 114, and then entered into the database 118, as described further below.

Figure 8:
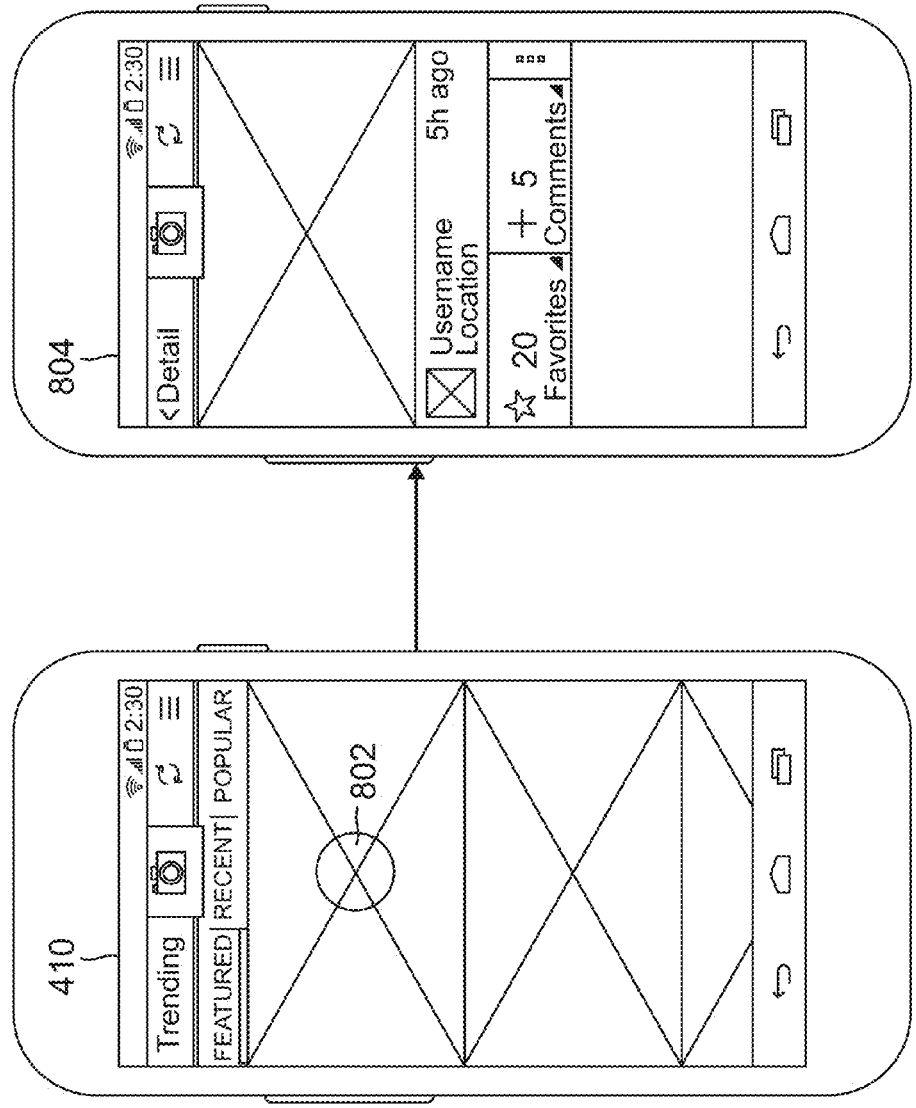
FIG. 8 is a diagram of a trending screen.

As shown in FIG. 8, the trending screen 410 may be initially presented as a number of images with no detail regarding the username of the user providing the VAC used to generate the VDC, favorites, or comments. This allows the screen real estate to be used more efficiently, and for the user to rapidly swipe the touch screen of the device 102 to view a large number of images in succession. Selecting on one of the images related to the VAC (e.g. by tapping area 802 transmits information to the VACAMS 100 requesting the trending detail, which is transmitted to the device 102 and rendered as shown in screen 804. The feed images may be static images, GIFs or videos. In one embodiment, the feed images present video files that are proxies for GIF files that are stored in the VACAMS 100 and broadcast in conjunction with the media program. For example, although a GIF is a series of still images, what is transmitted to the media devices 102 are MPEGs that mimic the multiple-images sequentially presented in a typical GIF. MPEGs are typically more lightweight that GIFs (as they use inter-prediction among frames); and this feature reduces the bandwidth required to transmit the proxy VDC to the media devices and the memory required to store the associated files. The proxy VDC may be transmitted as AAC, MPEG, HVAC, or any standard video format.

Figure 9:
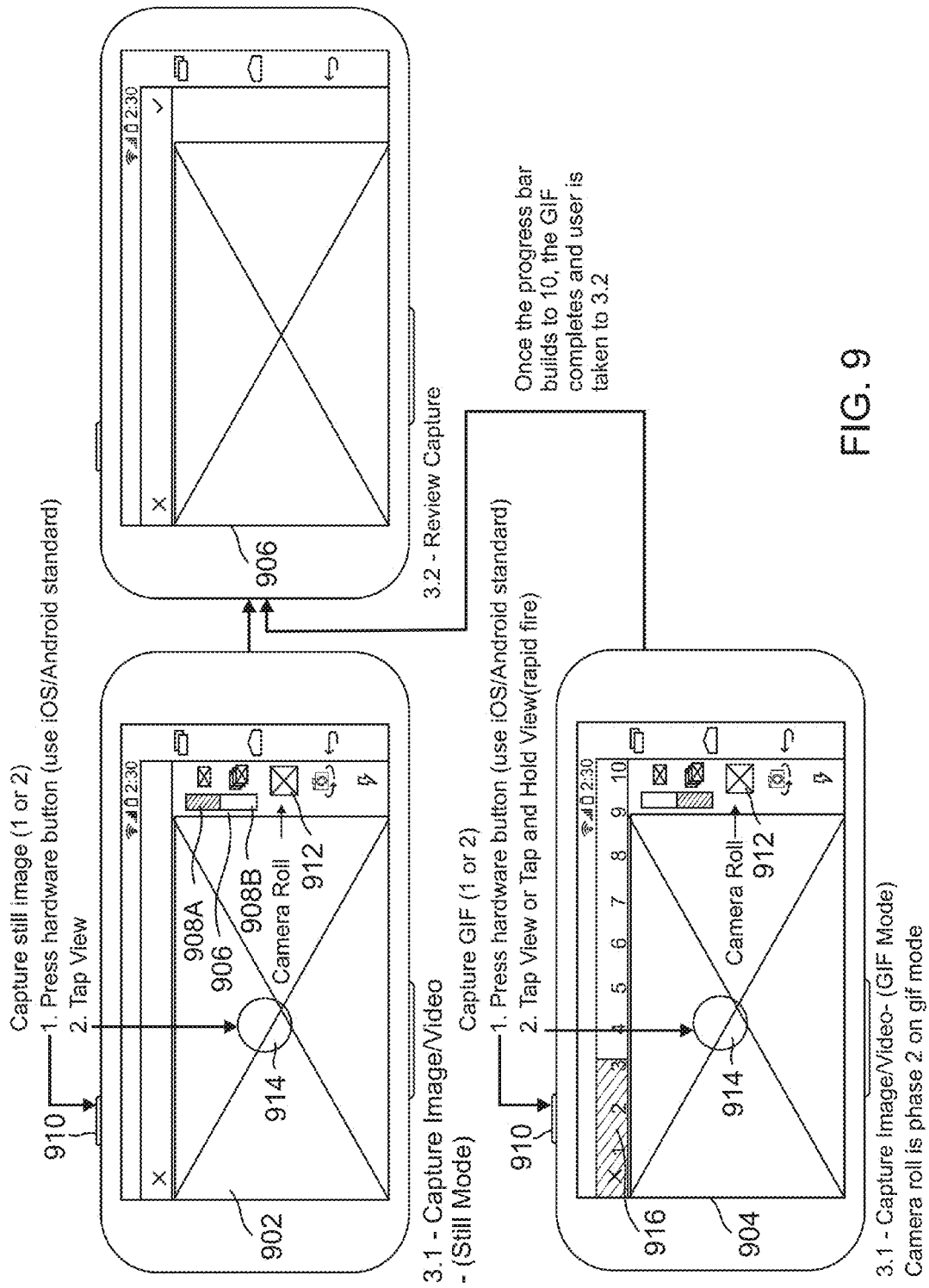
FIG. 9 is one embodiment of device interface used to generate the viewer-authored content for submission to the VACAMS or possible dissemination to other viewers and possible broadcast in conjunction with the media program.

FIG. 9 is one embodiment of device 102 interface used to generate the viewer-authored content for submission to the VACAMS 100 for possible dissemination to other viewers and possible broadcast in conjunction with the media program. The user may navigate to this screen by selecting content generation control 503 as shown in FIG. 5.

Two image capture modes are included for use in generating VDC: a single still image mode using screen 902 and a GIF mode using screen 904. In the illustrated embodiment, the still image capture screen 902 is initially presented. The still image capture screen 902 includes a control 906 that selects still image capture when in a first position 908A and multiple image capture for the GIF mode when the control 906 is moved to select second position 908B, thus providing screen 904.

Turning first to the single still image capture mode supported by screen 902, the user simply activates a control (hardware 910 or tap-control 912 on the touch sensitive screen) to capture an image, and taps the image itself (e.g. location 914 to review the captured image by viewing screen 906.

The multiple image capture screen 904 is used to obtain images that can be used generate a GIF. Once this screen 904 is active, the user activates a control (e.g. hardware control 910 or tap control 912), and a number of images are captured. In one embodiment, the capture of multiple images is accomplished using a screen similar to the single still image capture screen 902, with multiple image capture being indicated by holding down the control until the desired number of still images is obtained.

An area 916 of the screen 904 may be presented showing how many images of the series of images have been captured. As illustrated in FIG. 9, three of ten images have been captured.

Figure 10:
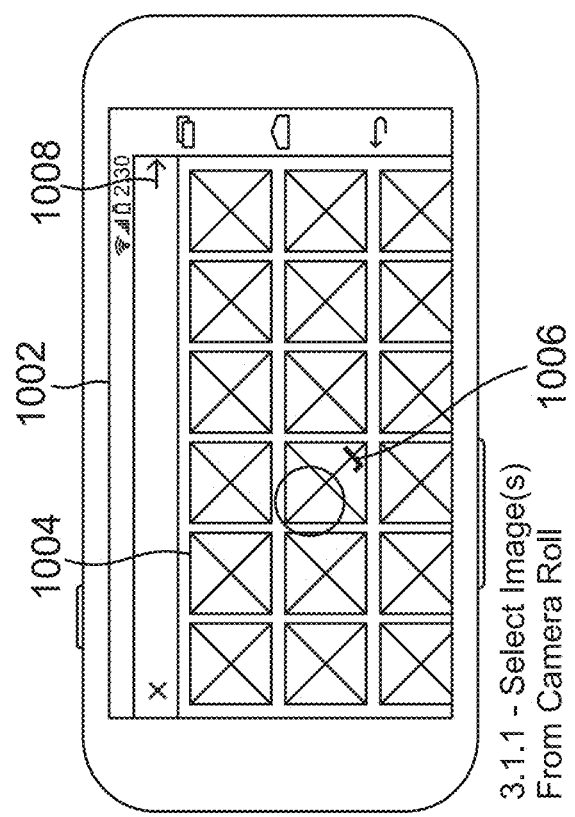
FIG. 10 is a diagram illustrating an exemplary embodiment of a capture screen.

FIG. 10 is a diagram illustrating an exemplary embodiment of a capture screen 1002. The capture screen 1002 illustrates a plurality of images taken using the interface shown in FIG. 9, and can be obtained by selecting control. The images 1004 presented in the capture screen 1002 can be selected for inclusion into or exclusion from the data that is transmitted to the CMS to generate the GIF. Selection can be made by tapping or touching the desired image(s), as shown in selected image 1006. The GIF is then prepared from the selected images as further described below.

Figure 11:
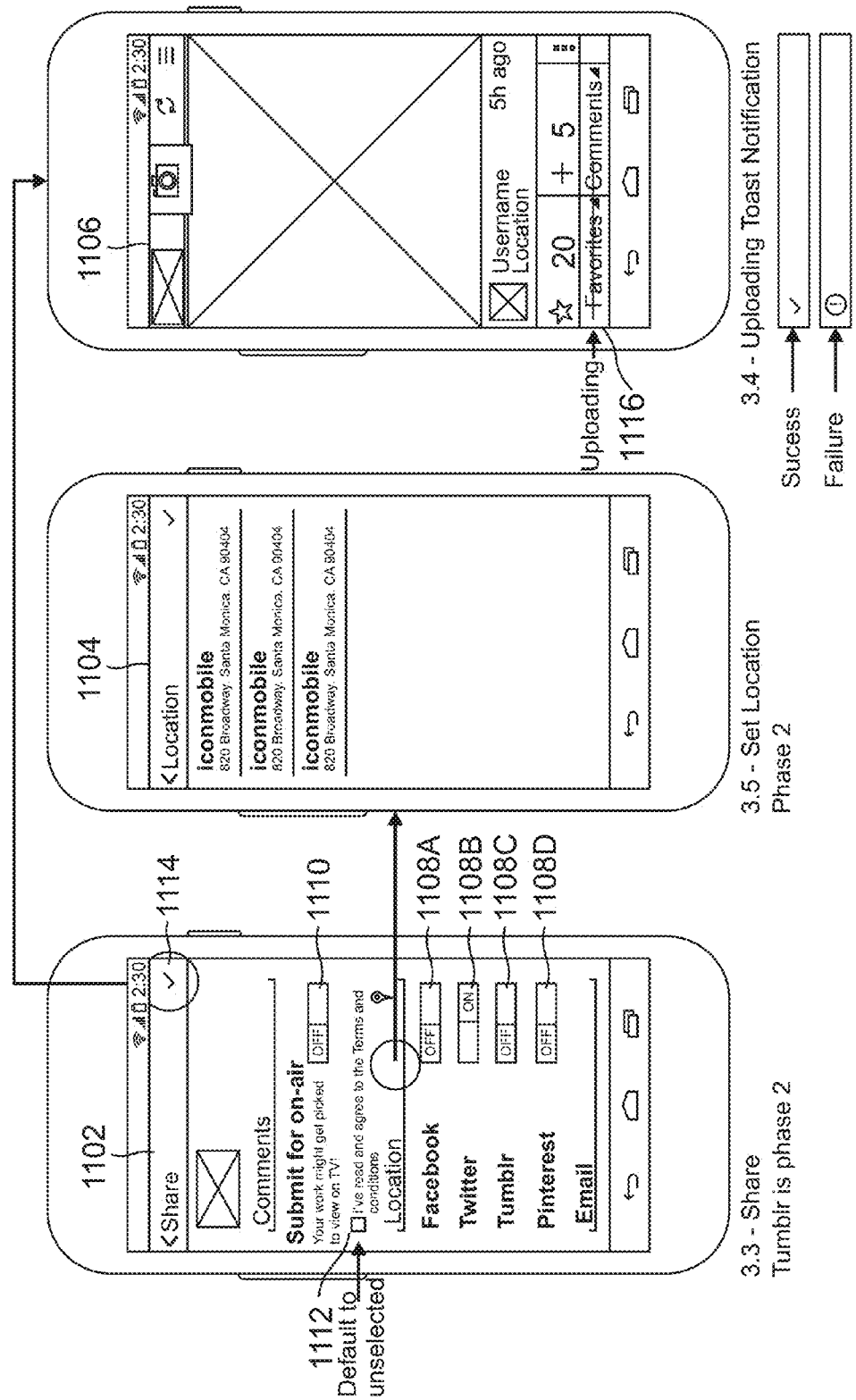
FIG. 11 is a diagram presenting a sharing screen.

FIG. 11 is a diagram presenting a sharing screen 1102 that is presented once the VAC (series of images) has been created. In one embodiment, this screen 1102 is presented in response to selection of control 1108 on screen 1002 presented in FIG. 10. FACEBOOK, TWITTER, TUMBLR, PINTEREST (depicted in FIG. 11 as well as FIGS. 12, 16, and 17) are registered trademarks of FACEBOOK, Inc., TWITTER, Inc., TUMBLR, Inc., and PINTEREST, Inc., respectively.

The sharing application executing on the device 102 may use pre-stored defaults or a control regarding whether the user would like to share the VAC or the VDC in social networks such FACEBOOK, TWITTER, PINTEREST, or TUMBLR, and indicating whether the user would like to submit the VAC to the VACAMS 100 for consideration for broadcast distribution. This allows the user to share the VAC or VDC simultaneously with social networks and the VACAMS 100 with a single command submitted via a single device. In the illustrated embodiment, separate controls 1108A-1108D are provided for each social network, and a separate control 1110 is provided to select whether the VAC or VDC generated from the VAC is submitted for on-air broadcast. Each of these controls may be individually specified to default to a particular value (off—do not share or on—share) and made available to change this value. The application executed on the mobile device 102 may be configured so that screen 1102 is always presented before sharing the VAC or VDC, or may be configured so that it may be skipped if the user indicates a desire to do so.

The sharing screen 1102 also includes a control 1112, which defaults to a "no" condition, asking whether the user has read and agreed to the terms and conditions of the submittal. The user may also desire to add metadata to the submitted VAC. Such metadata may include location information, which can be associated with the VAC for transmission to the VACAMS 100 by selecting the control adjacent the "location" text, which provides screen 1104 for selecting or inputting a location. Selecting the check control 1114 on the share screen 1102 causes the device 102 to present screen 1106, which shows a representation of the VAC, the username and location (if provided), and the upload status via a progress bar. The VAC is transmitted to the VACAMS 100. Success or failure of the upload may also be indicated in the same region as the progress bar.

Figure 12:
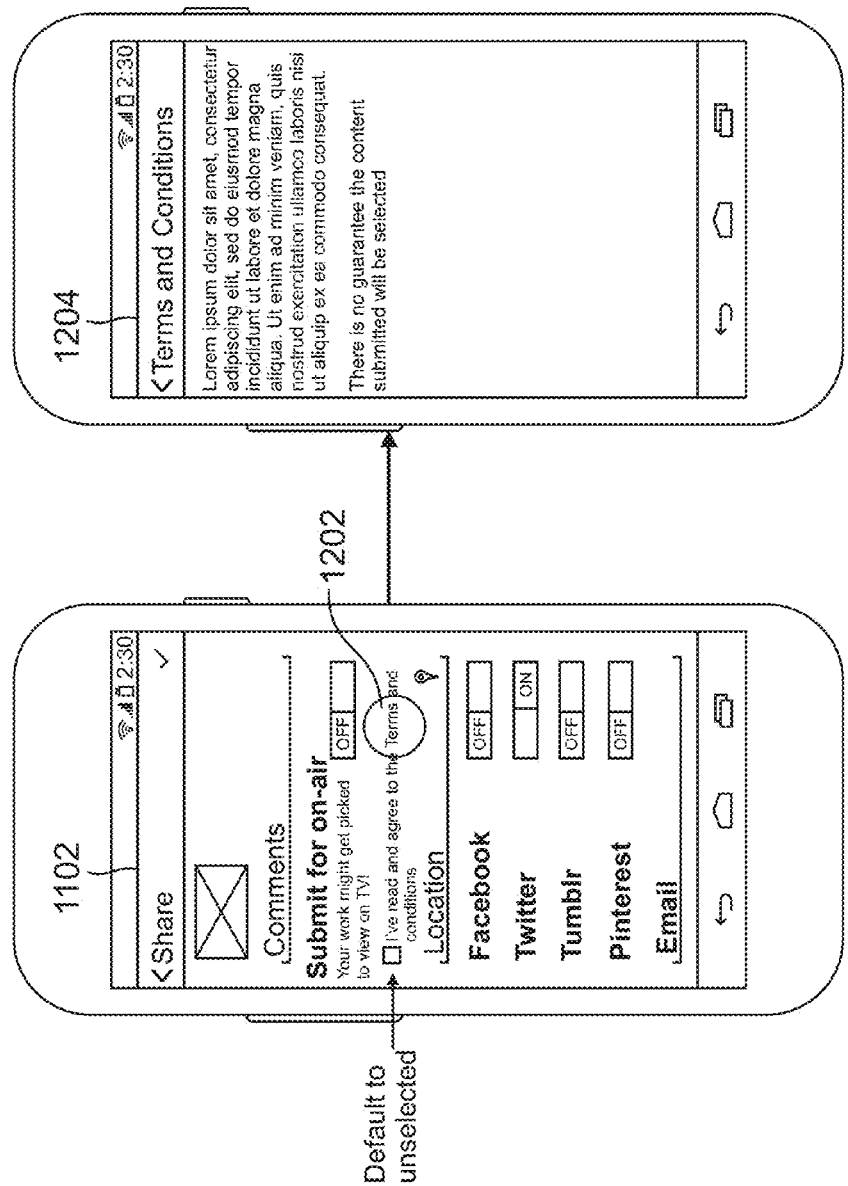
FIG. 12 is a diagram illustrating a "terms and conditions" screen.

FIG. 12 is a diagram illustrating a "terms and conditions" screen 1204 that is obtained by tapping a "terms and conditions" control 1202. The "terms and conditions" screen 1204 provides the terms and conditions of submitting the VAC to the VACAMs 100, including a reminder that submitted VAC or VDC generated therefrom may not be selected for broadcast. Preferably, the text of the terms and conditions is not stored locally on the device 102 or API 108, but rather, always retrieved from the VACAMS 100 on demand, thus guaranteeing that the latest terms and conditions are always displayed. Further, if the terms and conditions are changed from previous editions of the terms and conditions, the control 1202 may be highlighted, or the terms and conditions 1204 can be configured such that screen 1204 with the new terms and conditions must be presented before VAC can be submitted to the VACAMS 100.

Generating Viewer Derived Content (VDC) from the Viewer Authored Content (VAC)

The transmission of the viewer derived content (VDC) and associated is also depicted in block 208 of FIG. 2A. Referring to FIG. 2A, the web server 106 receives the VAC and metadata and stores it for further use, as shown in block 210. The VAC is then provided to the media server 110, which processes the VAC to generate viewer-derived content (VDC), as shown in block 216.

The VAC and VDC may take different forms, and the generation of VDC from the VAC can be implemented in several different embodiments. In this disclosure, VAC refers to content that is authored by the user and transmitted to the VACAMS 100 and optionally, user-selected social networks, while VDC refers to the viewer derived content that is generated from the VAC by the VACAMS 100, including the VAC that is broadcast, or transmitted back to the device 102 for viewing, or optionally, to social networks. Table 1 below provides a summary of different embodiments of VAC and VDC formats and where they are generated.

TABLE 1

| VAC | VDC | Destination |
|---|---|---|
| Image | Reformatted/Enhanced Image | Broadcast/Website |
|  | Reformatted/Enhanced Image | Return to User Device |
| Image | JPEG | Website |
| sequence | GIF | Website |
|  | MPEG - High Resolution/Frame Rate | Broadcast/Website |
|  | MPEG - Reduced Res/Frame Rate | Return to User Device |
| GIF | Reformatted/Enhanced GIF | Website/Return to User Device |
|  | MPEG - High Resolution/Frame Rate | Broadcast/Website |
|  | MPEG - Reduced Res/Frame Rate | Return to User Device |
| MPEG | GIF | Website |
|  | Reformatted/Enhanced MPEG - High Resolution/Frame Rate | Broadcast/Website |
|  | Reformatted/Enhanced MPEG - Reduced Res/Frame Rate | Broadcast/Website |

As illustrated in table 1, the VAC transmitted from the device 102 to the VACAMS 100 may be a single simple image. The image may be uncompressed (in RAW or *.bmp format) or may be compressed in a *.jpg (Joint Picture Expert Group) compliant other format (e.g. *.png, *.gif, *.tif, or *.img). The VACAMS 100 may then generate a image that is reformatted to another compression standard (or decompressed image), and may also enhance the image to make it more suitable for broadcast. For example, the VAC may be of a pixel dimension(s) that is inconsistent with broadcast standards and may need to be cropped or resized to convert the image to an appropriate size. The VAC image may also need enhancements to adjust contrast, equalization, hue, or saturation to make the image consistent with the contrast, equalization, hue, or saturation of other images (including video images) presented by the broadcaster at substantially the same time interval.

Different VDC may be generated from the VAC. For example, Table 1 shows that the VDC may include two reformatted/enhanced images, one for broadcast purposes, and the other for returning to the device 102 so that it may be displayed to the user that submitted the VAC used to generate the VDC. This is useful in reducing transmission bandwidth and capacity requirements, because the VDC transmitted back to the user device may be more strongly compressed or may be a lower resolution image than the image used in the broadcast or website or even the VAC originally submitted.

In one embodiment, the application executing on the mobile device automatically configures the VAC image to be consistent with broadcast requirements. For example, if the broadcasted image requires a minimum 720 pixel resolution, the application executing in the device 102 can be configured to either take the image itself with a 720 pixel resolution, command an independent photo application executing on the device 102 to use a minimum 720 pixel resolution, or can convert an image taken with a different (e.g. lower) resolution to one that is 720 pixels.

In another embodiment, the VAC transmitted by the device 102 comprises a series or sequence of still images. While it is possible for the application executing on the device 102 to create a GIF for transmission to the VACAMS 100, GIFs typically have a limited color palette of 256 colors that make GIFs less than ideal for reproducing color photographs for a website or for making movies. GIFs, however, are better suited for simpler images such as graphics or logos with large swaths of solid color. This embodiment has the advantage of providing the highest quality images to the VACAMS 100 for use in generating the VAC, so that images of the high resolution and quality are available for broadcast.

As shown in Table I, the sequence of still images is transmitted to the VACAMS 100 which then generates one or more GIFs or MPEGs based on the sequence of still images. The series of images can be compressed (for example, by creation of a *.jpg or a *.tif file for each image and a *.zip file comprising the plurality of *.jpg or *.tif files) before transmission to the VACAMS 100, where the *.zip file can be decompressed, and the image files recovered. The image files can be used to create additional or alternative image files such as JPEGs. Such filed may be resized, cropped, or otherwise adjusted for use in a website or broadcast, as described above.

Also as shown in Table I, the recovered still images can be used to generate one or more MPEGs. For example, one MPEG can be a high resolution/frame rate MPEG that is used for broadcasting to other users or for an associated website, and another MPEG can be a lower resolution/frame rate version that is transmitted back to the device 102 that provided the VAC, to allow the user to view the generated VDC.

In one embodiment, one or both of the MPEGs (used for broadcasting/website and for later transmission to the user device that provided the VAC to create the VDC) are created directly from the sequence of still images. In another embodiment, the GIF is created, and one or more MPEGs are created from the GIF. For example, a higher resolution MPEG can be generated from the GIF for broadcast or website use, while a lower resolution MPEG can be generated from the GIF and transmitted back to the device 102 that provided the VAC, thus allowing the user to view the VDC derived from the VAC they authored, for example, on the same user device used to author the VAC. This embodiment has the advantage that MPEGs offer greater compression than do GIFs and thus require less bandwidth to transmit back to the device 102. Additionally, lower resolution MPEG files are smaller in size, thus requiring less storage on both the VACAMS 100 and the user device 100 and are readily reproducible using software resident on a wide variety of user devices 102.

In another embodiment, the VAC comprises a GIF that is generated by the device 102 using the series of still images. The GIF is then transmitted to the VACAMS 100 and used to generate a reformatted/enhanced GIF. The GIF may be resized to be smaller or larger, cropped, split or otherwise optimized. This may involve a color reduction (less than 256 colors) lossy compression, or can remove frames (e.g. every nth frame). The resulting GIF may be used on a website or (particularly smaller GIFs), returned to the device 102. Further, a high resolution and/or frame rate MPEG can be produced for broadcast/website purposes and a reduced resolution and/or frame rate MPEG can be generated for to return to the user device 120.

Finally, in another embodiment, the VAC comprises an MPEG that is generated by the user device either using a series of still images or by use of a movie generating application resident in viewer-authored media sharing application. The generated MPEG file is transmitted from the device 102 to the VACAMS 100, where it is received and processed, as shown in block 216. Still images can be extracted from the MPEG file and used to generate reformatted/enhanced still images or a GIF based on the still images. Further, a reformatted/enhanced MPEG may be generated from the VAC.

Returning to FIG. 2A, the VAC received from the user device, the VDC generated from the VAC, and metadata associated with the submitted VAC or the processed VDC is stored in the database 118, as shown in blocks 218. Viewer authored metadata may include viewer permission to broadcast the VAC or modifications of the VAC such as the VDC, information sufficient to confirm viewer competency to enter agreements to broadcast the VAC or VDC, viewer contact information and viewer geographical location. Such information may be provided with registration information or provided with the VAC, and can be automatically verified by comparison with verifying information from sources independent from the information provided by the user. For example geographical information may be confirmed from the Internet Protocol (IP) address of the user.

The metadata may include any of the data entered by the user (e.g. permissions, the name of the submitting user, social network identifiers of the user, hashtags or keywords, and a title of the VAC), and may also include metadata generated by the VACAMS 100 based upon the VAC or the VDC. For example, such metadata may include additional keywords generated from analysis of the VAC (for example, by image recognition) or metadata describing the generated VDC (resolution, pixel size, frame rate, for example).

Block 220 illustrates the generation of a VDC proxy from the generated VAC. For example, in the above-described case where a sequence of images are transmitted from the device 102 to the VACAMS 100 and used to generate the VDC in the form of a GIF, an MPEG file may be generated from the GIF as a proxy for the VAC. The VDC in the form of a GIF may present a sequence of 10 still images, but while the VDC proxy in the form of an MPEG may comprise 50 frames or more (some of which are I-frames, some P or B frames), the MPEG may be more highly compressed than the GIF and thus require less transmission bandwidth to transmit the VDC to the device 102 that submitted the VAC or viewer devices 102 associated with other users. In block 222, the VDC proxy is stored in the database. Finally, the VDC proxy is transmitted to the viewer device, as shown in blocks 224 and 226. In accordance with the metadata associated with the VAC and/or VDC (or a URL to an entity hosting the VAC or VDC may be sent to social networks as directed by the user, as shown in block 228. Although this task is illustrated as being performed by the CMS 114, in alternate embodiments, the VAC, VDC proxy, and/or a URL to the VAC/VDC proxy may be transmitted from the VACAMS 100 to the viewer device API 108, and the API 108 forwards this information to the designated social networks.

Figure 13:
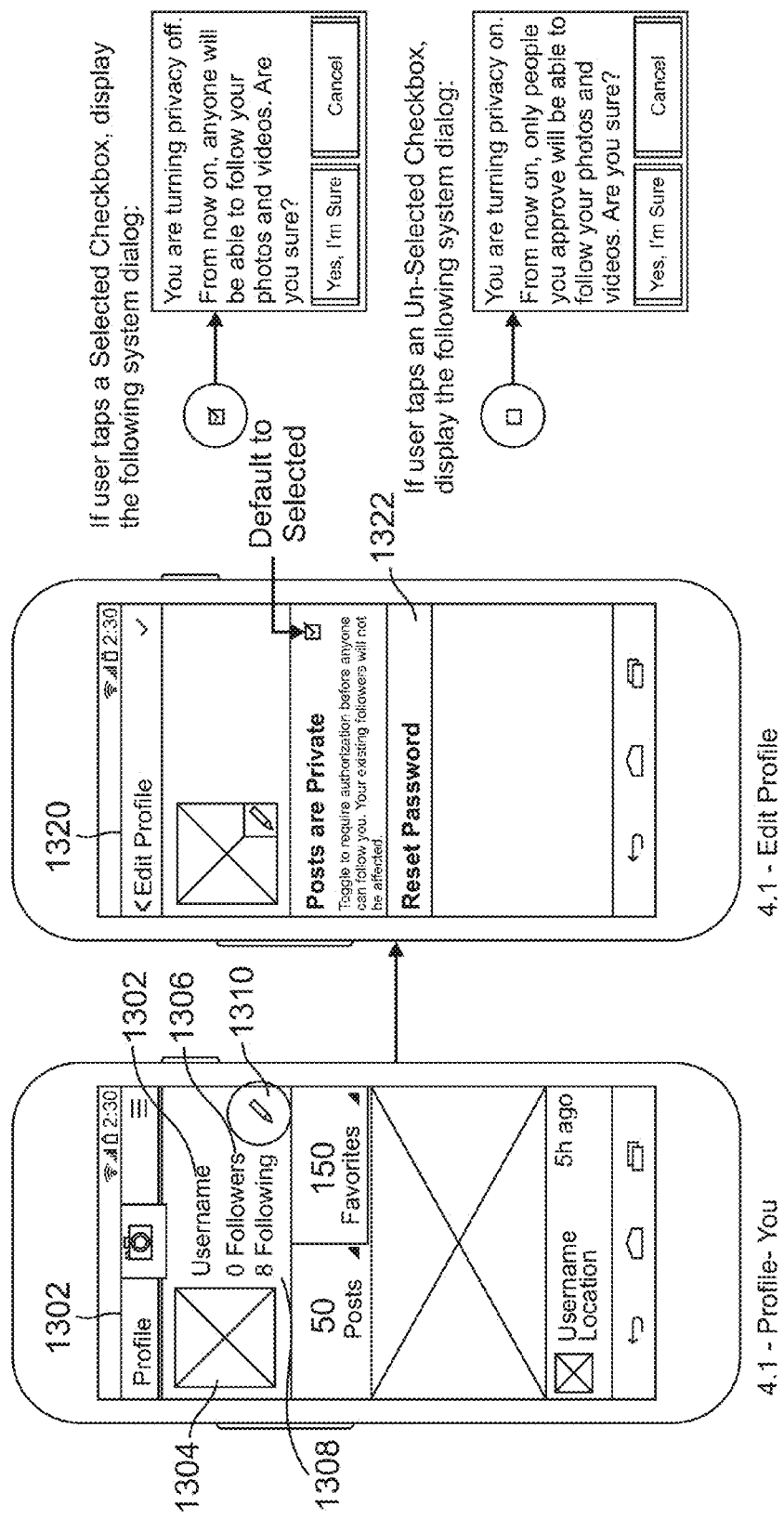
FIG. 13 is a diagram showing screens that are presented by the device in response to the selection of the profile control.

FIG. 13 is a diagram showing screens that are presented by the device 102 in response to the selection of the profile control 524 shown in screen 404. Profile screen 1302 presents the user name 1302 for the viewer, a profile photo 1304 as submitted by the viewer, the number of users 1306 that are following the viewer identified with the username, and the number of persons the viewer is following 1308. Selection of these items opens screens showing the persons following the viewer and the other viewers that the viewer is following, respectively. Selection of the illustrated edit control 1310 presents the edit profile screen 1320, which allows the user to edit their profile, and privacy preferences. Another control permits the user to change or reset a password, as shown using screen 1402 presented in FIG. 14.

Figure 14:
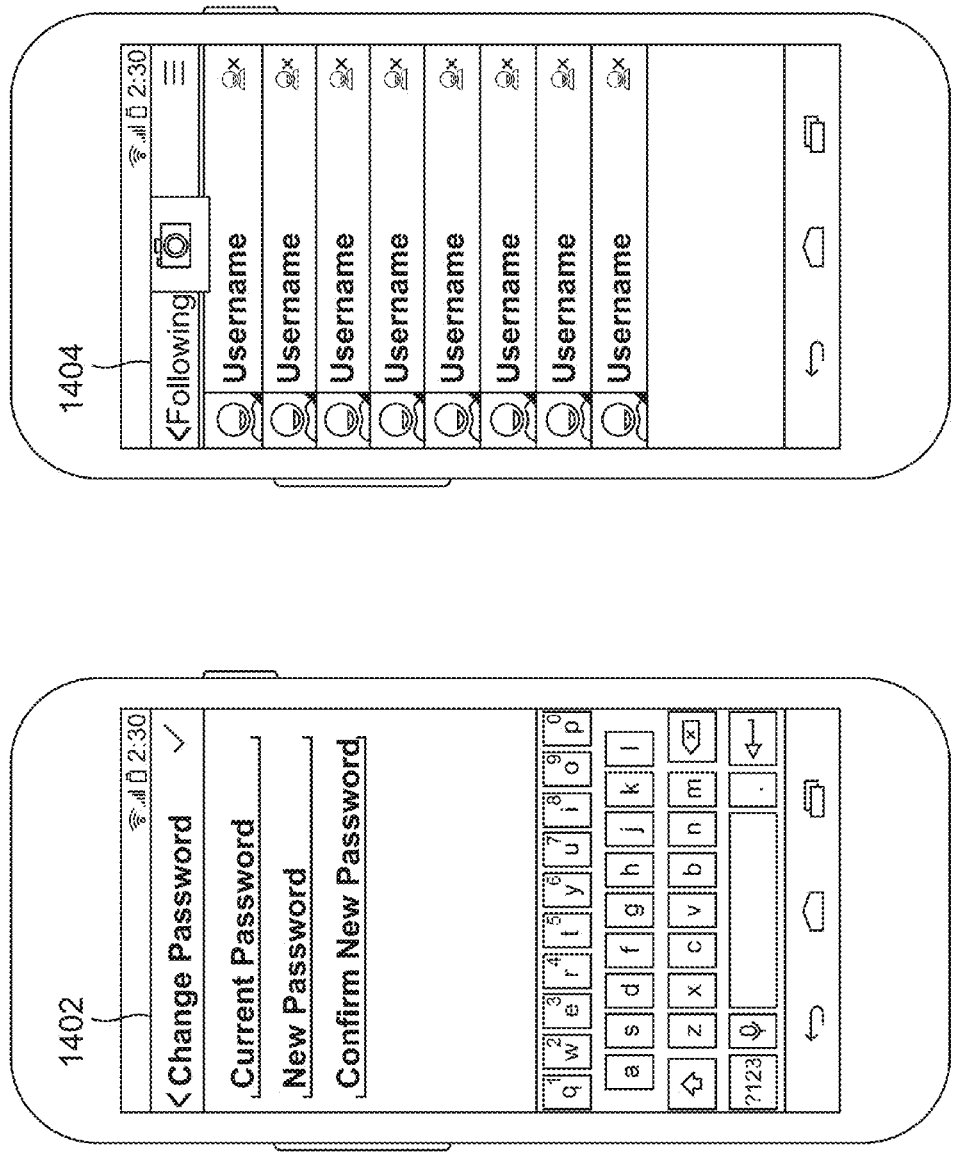
FIG. 14 is a diagram showing screens used to edit the viewer profile.

FIG. 14 is a diagram showing a first 1402 and second 1404 screen used to edit the viewer profile shown in FIG. 13. Selection of control 1322 of screen 1320 allows the user to edit or reset their password, and presents screen 1402 for this purpose. Selection of the "following" link 1308 in screen 1302 presents screen 1404, which indicates the usernames for other viewers that the user is "following."

Figure 15:
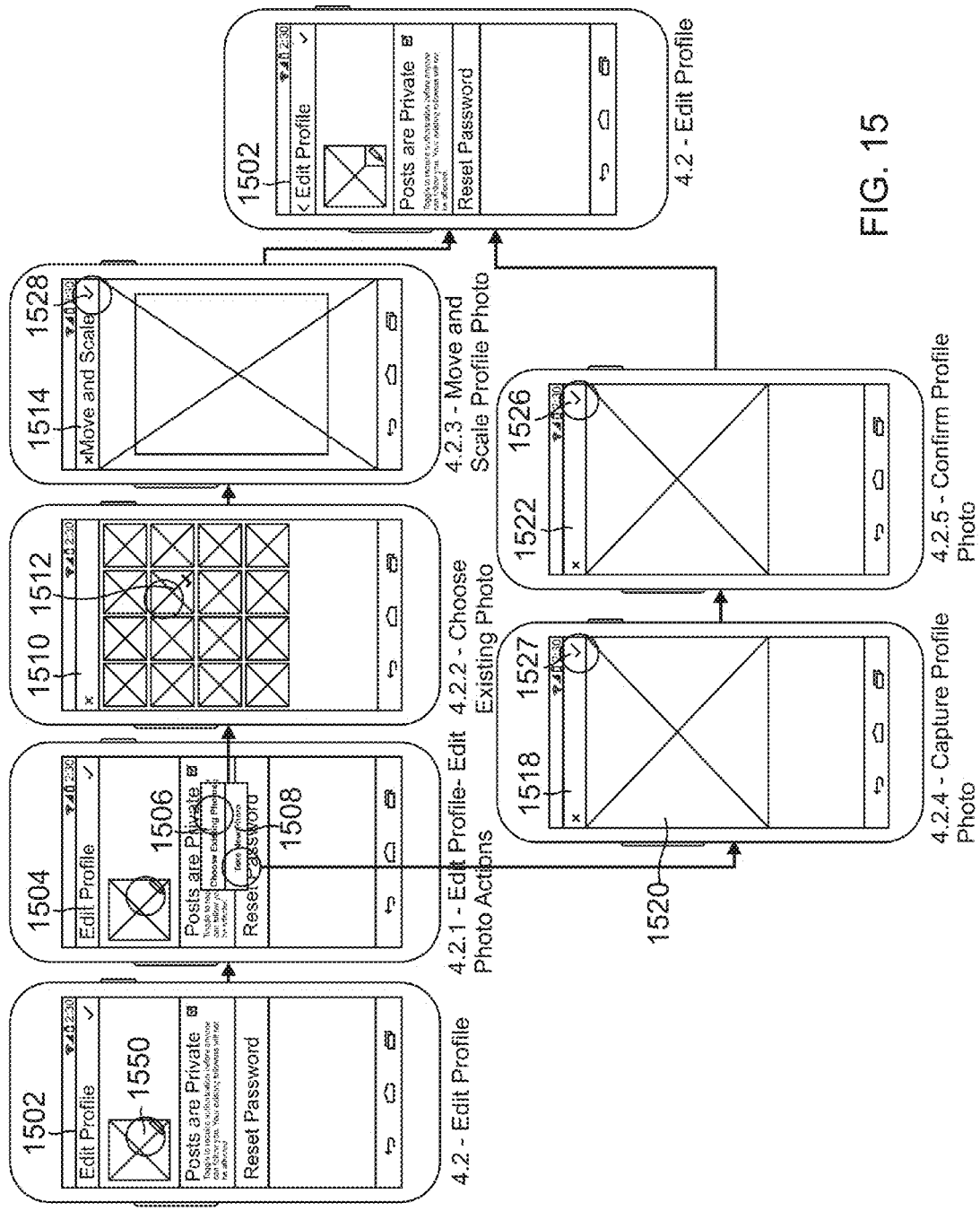
FIG. 15 is a diagram presenting a series of screens that can be provided so as to allow the user to utilize the device to edit their profile to choose a profile photo.

FIG. 15 is a diagram presenting a series of screens that can be provided so as to allow the user to utilize the device 102 to edit their profile to choose a profile photo. Selection of the photo or placeholder 1550 raises an interface screen 1504 providing a control having a first element 1506 allowing the user to choose from one of a plurality of existing photos and a second element 1508 allowing the user to take a new photo. If the user selects an existing photo control element 1506, such photos are presented for selection and scaling as shown in screen 1510. The user selects the desired photo by tapping it as indicated by 1512, which presents screen 1514, which reproduces the photo in larger size (full screen), and allows the user to scale and crop the photo using gestures by pinching and unpinching the photo and tapping and moving the photo, respectively. Once edited, the photo is confirmed by selection of control 1528, and the screen returns to the edit profile screen 1502. If the user elects to take a photo (selected by control 1508, photo is captured a shown in screens 1518 and 1522 of FIG. 15. An image sensed by the camera of the device 102 is sensed and is presented in area 1520, and selection of control 1524 records the image. Following recordation; the image is presented in area 1520, and selected for use (e.g. confirmed by selecting control 1526) and the screen returns to the edit profile screen 1502.

Figure 16:
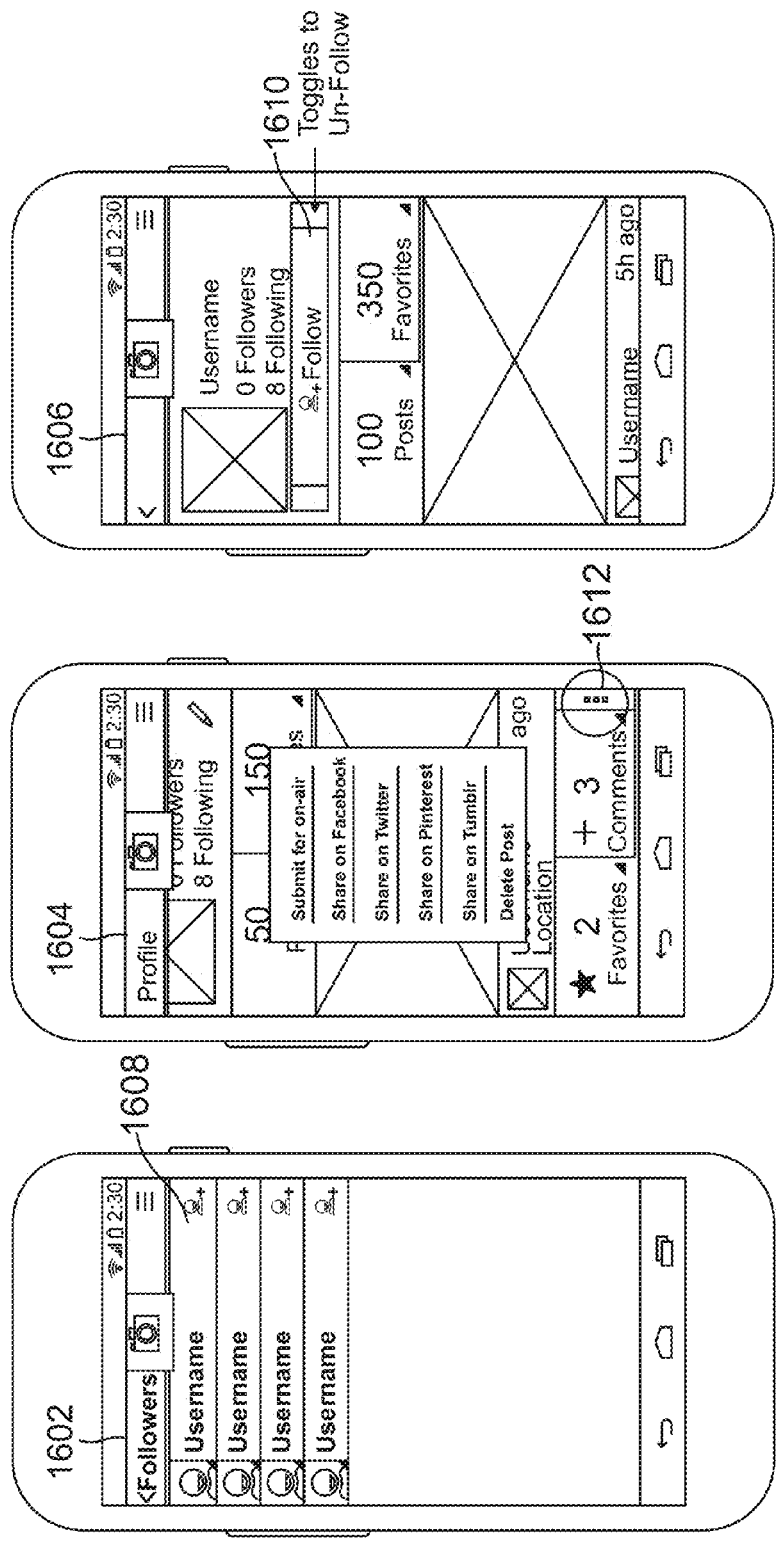
FIG. 16 presents a series of screens by which the user may change which other viewers they follow using the application executing on the device.

FIG. 16 presents a series of screens by which the user may change which other viewers they follow using the application executing on the device 102. Screen 1602 is presented following user selection of control 1306 to determine who the viewer is following. Selection of one of the usernames 1608 toggles whether the viewer associated with the user name is permitted to follow the user of the device 102. Further, each of the indicated usernames 1608 can be selected for further information, as shown in screen 1606. Selection of control 1610 toggles a "follow/unfollow" condition with respect to the viewer having the indicated username.

The user's profile-related posts or profile photos may be submitted for on-air consideration, submitted for sharing via a social network, or deleted, by selecting the ellipses control 1612 shown in profile posts action screen 1604 and selecting the appropriate option on the profile posts action screen 1604. Thus, when VAC is submitted to the VACAMS 100 and selected for broadcast, the profile picture of the viewer submitting the VAC can also be provided for broadcast. Thus, the viewer's profile photo is also a category of VAC.

Figure 17:
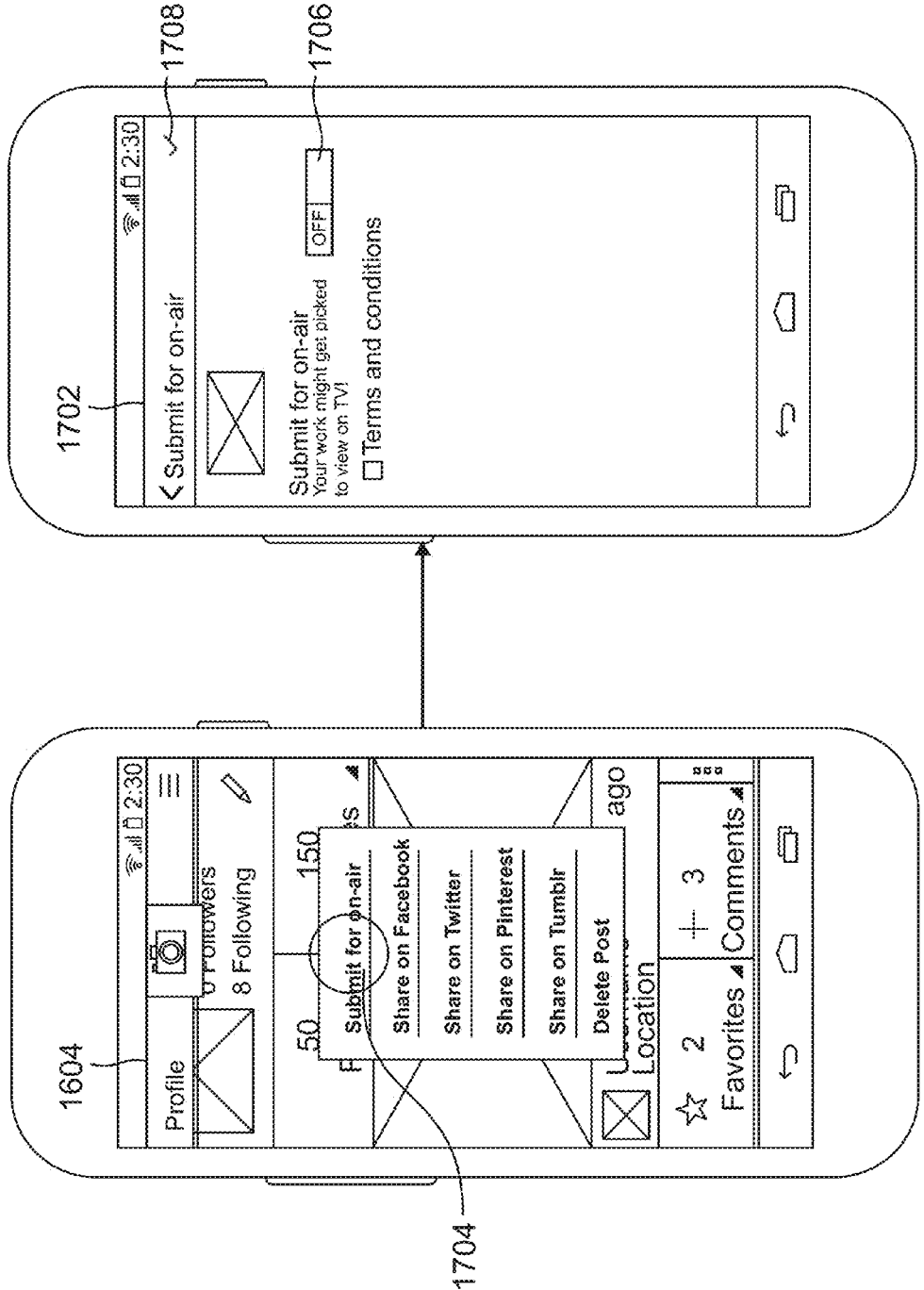
FIG. 17 is a diagram showing the exemplary profile posts action screen.

FIG. 17 is a diagram showing the exemplary profile posts action screen 1604 and the "share/submit" 1604. Selection of the "submit for on-air" control 1704 presents the submit screen 1702. The user submits the profile pix or profile post for on-air consideration by toggling control 1706 and selecting control 1708.

Figure 18:
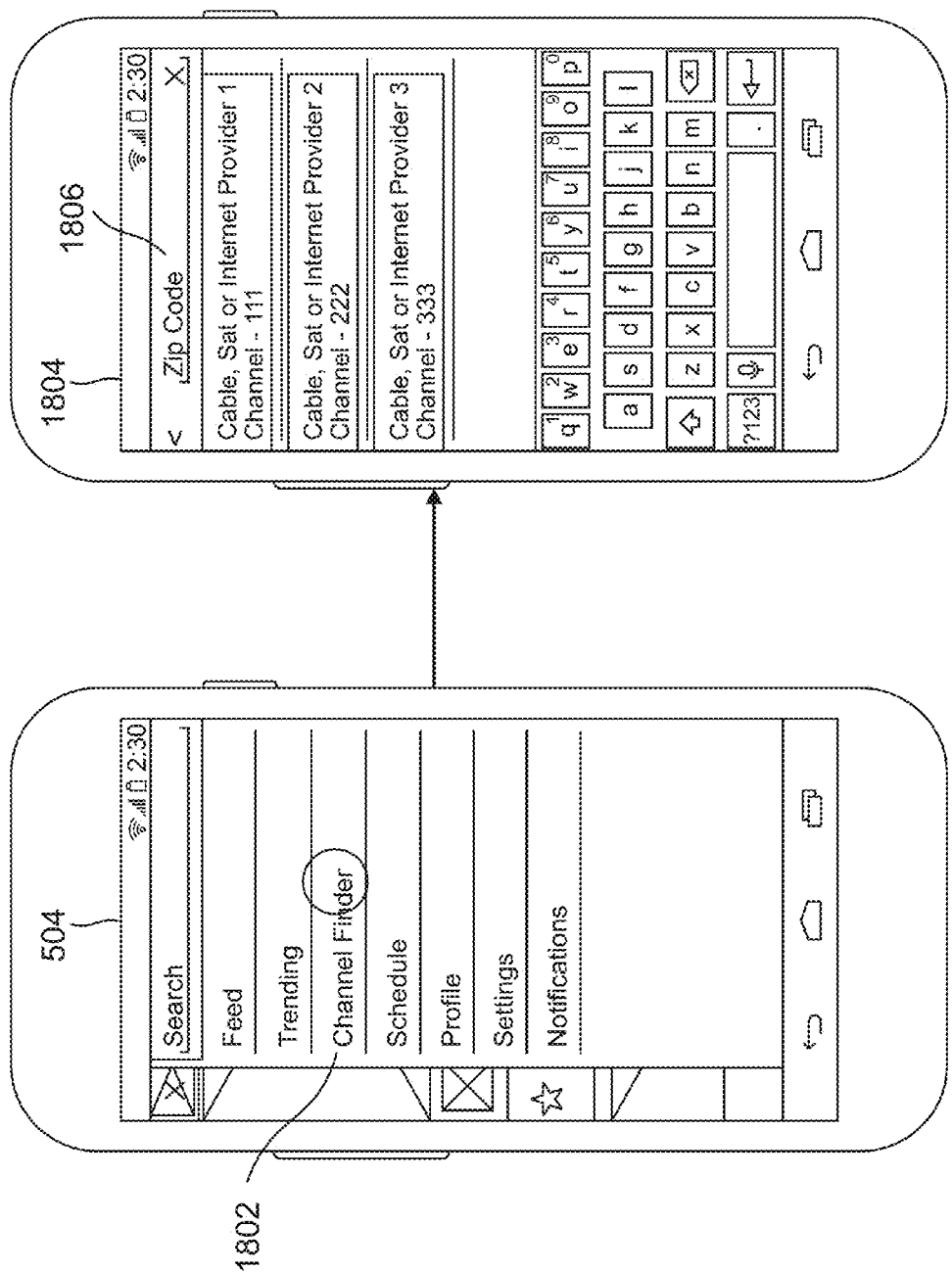
FIG. 18 is a diagram showing the main menu screen with a "channel finder" control selected.

FIG. 18 is a diagram showing the main menu screen 504 with the "channel finder" control selected 1802. This feature is a web-component that is available for use by the application on the device 102. This feature allows the user to find the network broadcast channel or Internet uniform resource locator (URL) transmitting the media program of interest (and typically related to the viewer-authored content) for one or more broadcasters 122. The user may enter a zip code into an appropriate portion 1806 of the screen 1804, or the zip code may already be known to the VACAMS 100 via previous user input. Other means to determine the location of the user can be used as well. The device 102 transmits the appropriate information to the VACAMS 100, and the VACAMS 100 responds by searching for the appropriate broadcast channel number or URL and transmitting that channel number to the device 102. In one embodiment, the user may then view the broadcast by selecting the interface shown in screen 1804 if being currently transmitted.

Figure 19:
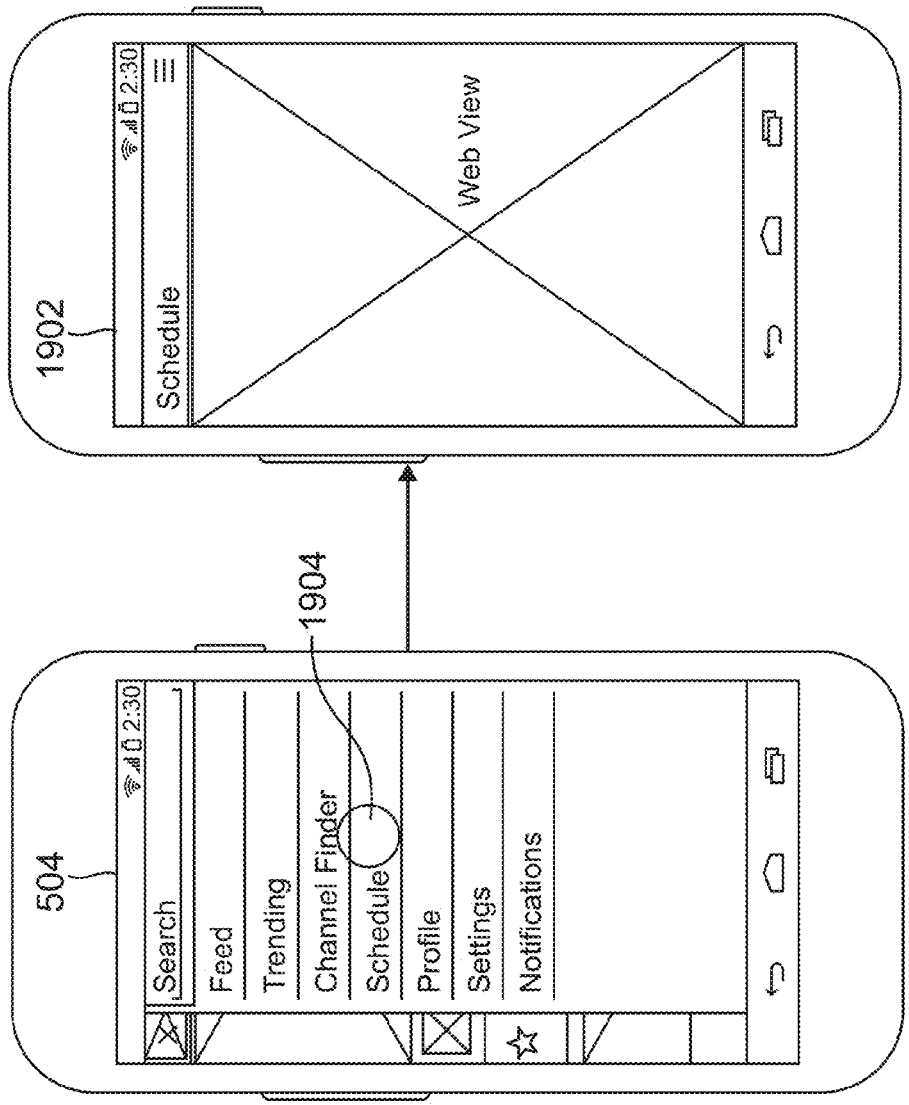
FIG. 19 is a diagram illustrating the selection of the "schedule" option in the main menu screen.

FIG. 19 is a diagram illustrating the selection of the "schedule" option in the main menu screen. Selecting this control 1904 sends a message to the VACAMS 100 to retrieve schedule information from a webserver or website describing broadcast schedules of the media program of interest. This information may be obtained from broadcasters 122 or third party providers.

Figure 20:
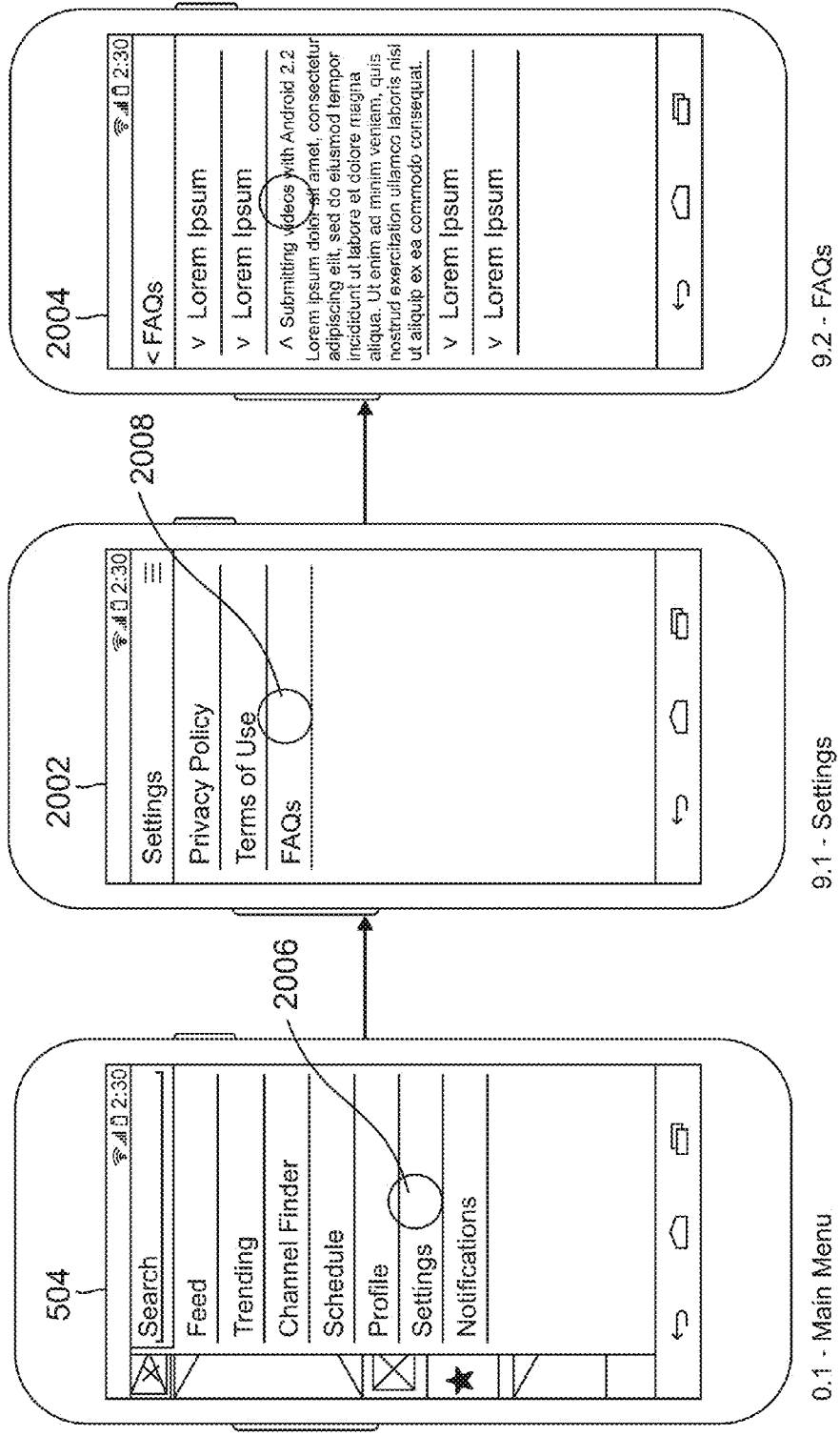
FIG. 20 is a diagram illustrating the selection of a "settings" control.

FIG. 20 is a diagram illustrating the selection of the "settings" control 2006 from the main menu screen 504, and the further selection of a "frequently asked question" control 2008 to obtain answers to frequently asked questions, as presented on screen 2004.

Figure 21:
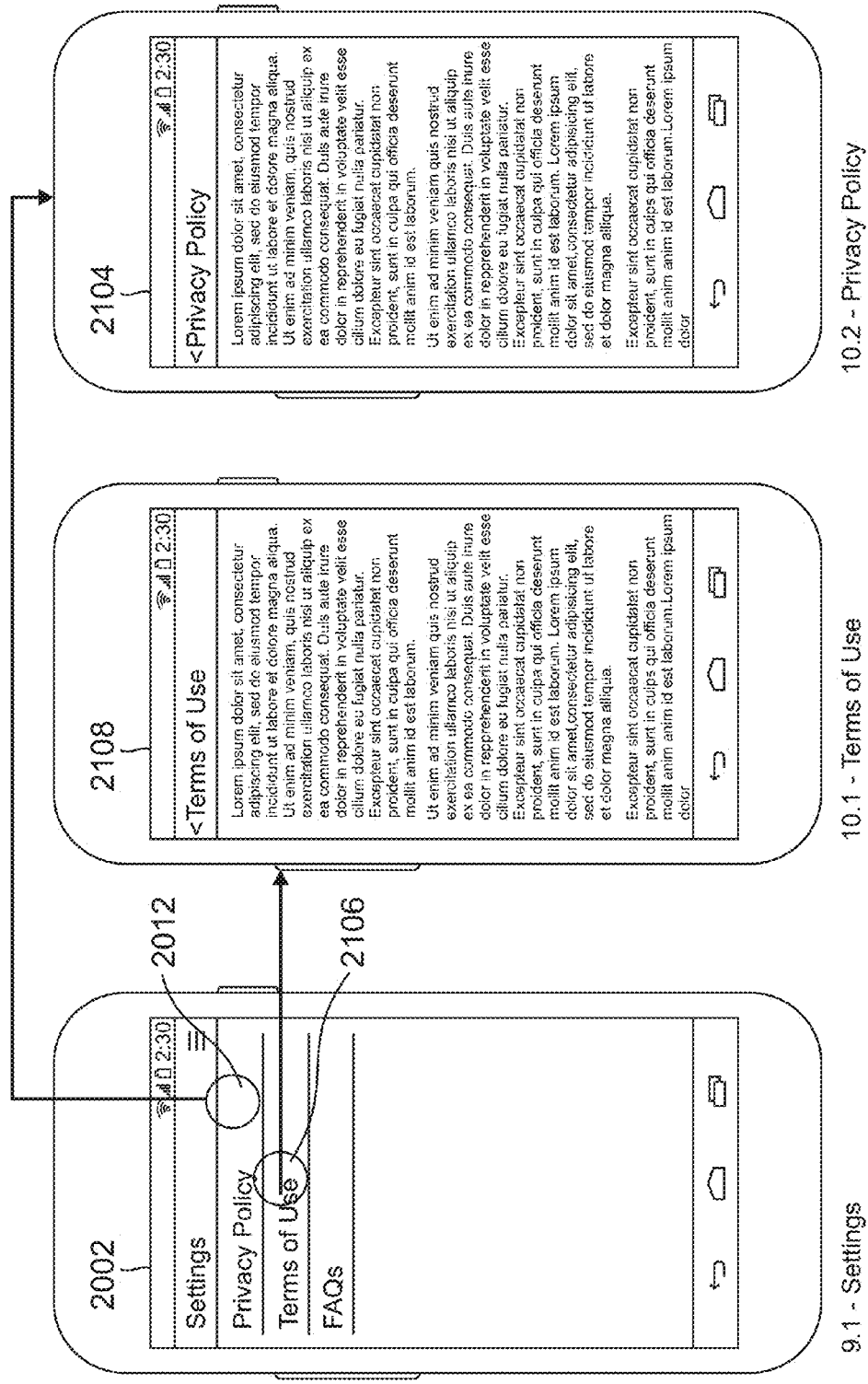
FIG. 21 is a diagram illustrating the settings screen.

FIG. 21 is a diagram illustrating the settings screen 2002. The settings screen 2002 further includes a privacy policy control 2102, which, when selected presents a private policy screen 2104 and a terms of use control 2106, which, when selected presents a terms of use screen 2108. As described above, this information is typically retrieved from webserver 106 for presentation, to assure that the latest updates in privacy policy and terms of use are provided.

Figure 22:
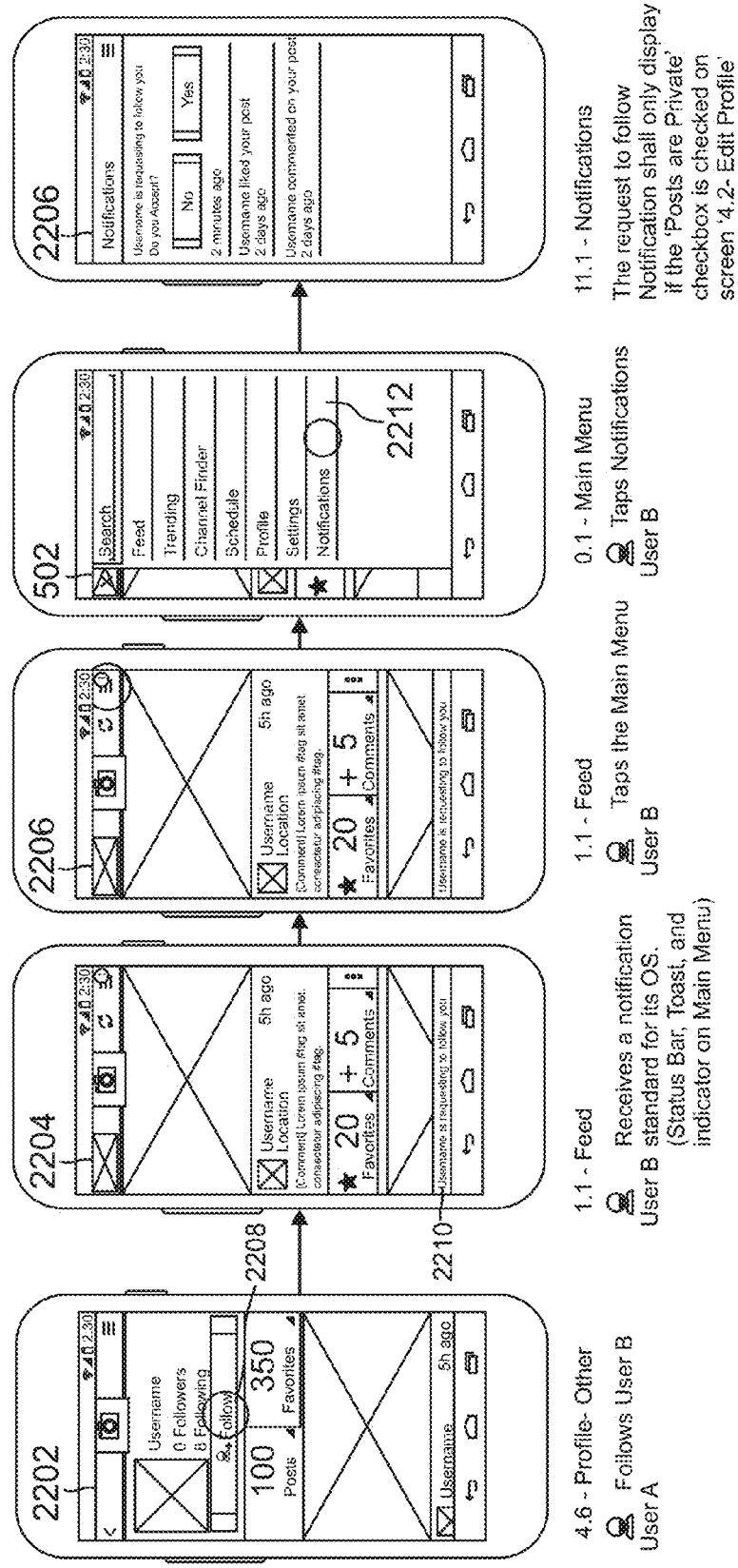
FIG. 22 is a diagram illustrating how another viewer requests to follow the user.

FIG. 22 is a diagram illustrating how another viewer requests to follow the user. Screen 2202 depicts another device 102 associated with another user viewing the subject user's profile. The other user can elect to follow the subject user by selecting the "follow" control 2208 as illustrated. Screen 2204 illustrates the response presented on the subject user's feed page, including a message that another user is requesting to follow the subject user. To respond, the subject user selects the main menu control illustrated on screen 2206, thus presenting the main menu screen 504. The user may select the notifications control 2212, and is then presented with a screen 2214 presenting controls to either allow or disallow the another user from following the subject user.

Figure 23:
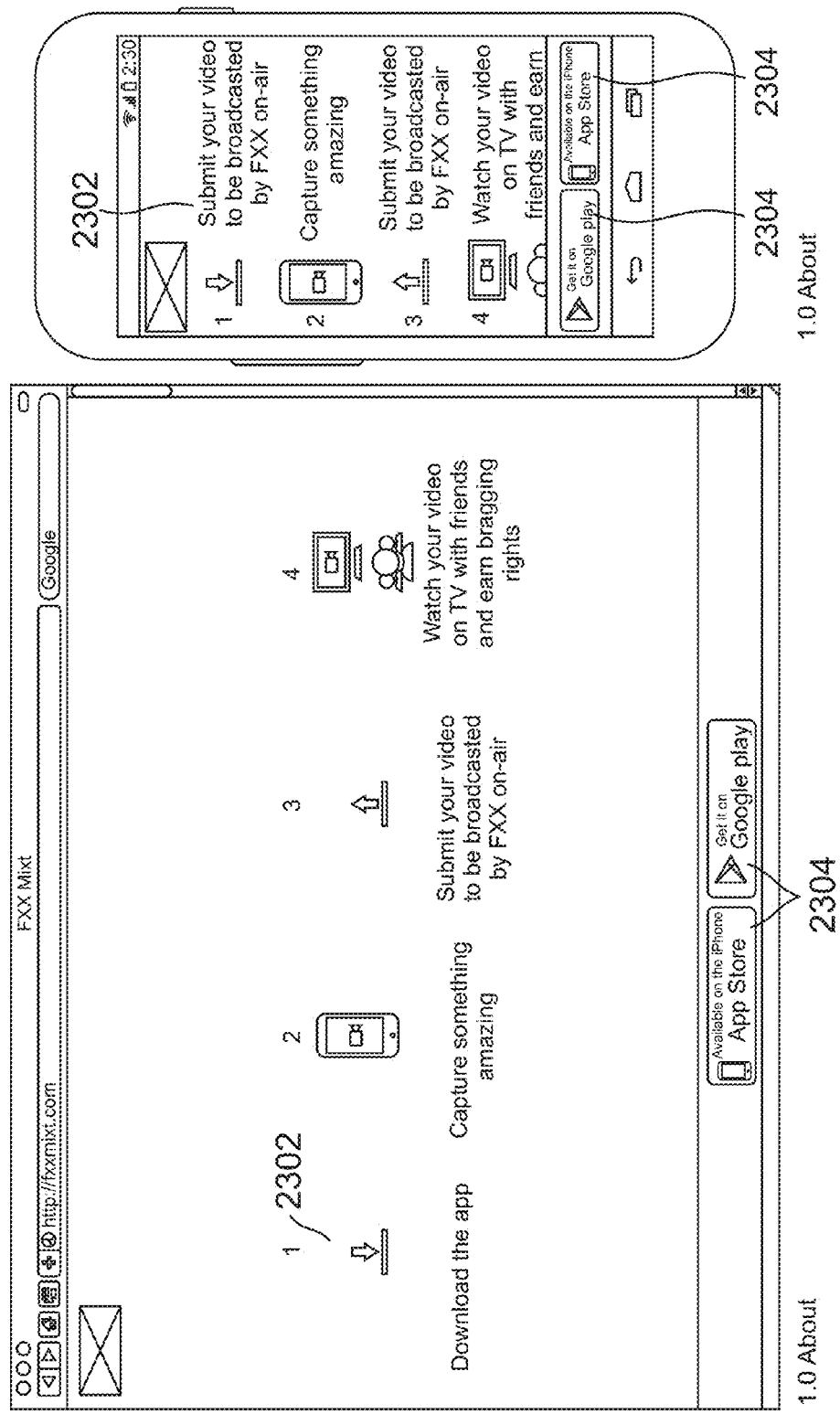
FIG. 23 illustrates an analogous welcome screen for presentation within a computer's display.

FIG. 23 illustrates an analogous welcome screen for presentation within a computer's display using, for example, using a web browser. This may be presented on a web browser retrieving information from a website at a URL, for example. Links may be provided to download the application, whether from the website 2302 or from a third party vendor 2304. IPHONE and APP STORE are registered trademarks of the APPLE CORPORATION, and GOOGLE is a registered trademark of GOOGLE, Inc.

Figure 24:
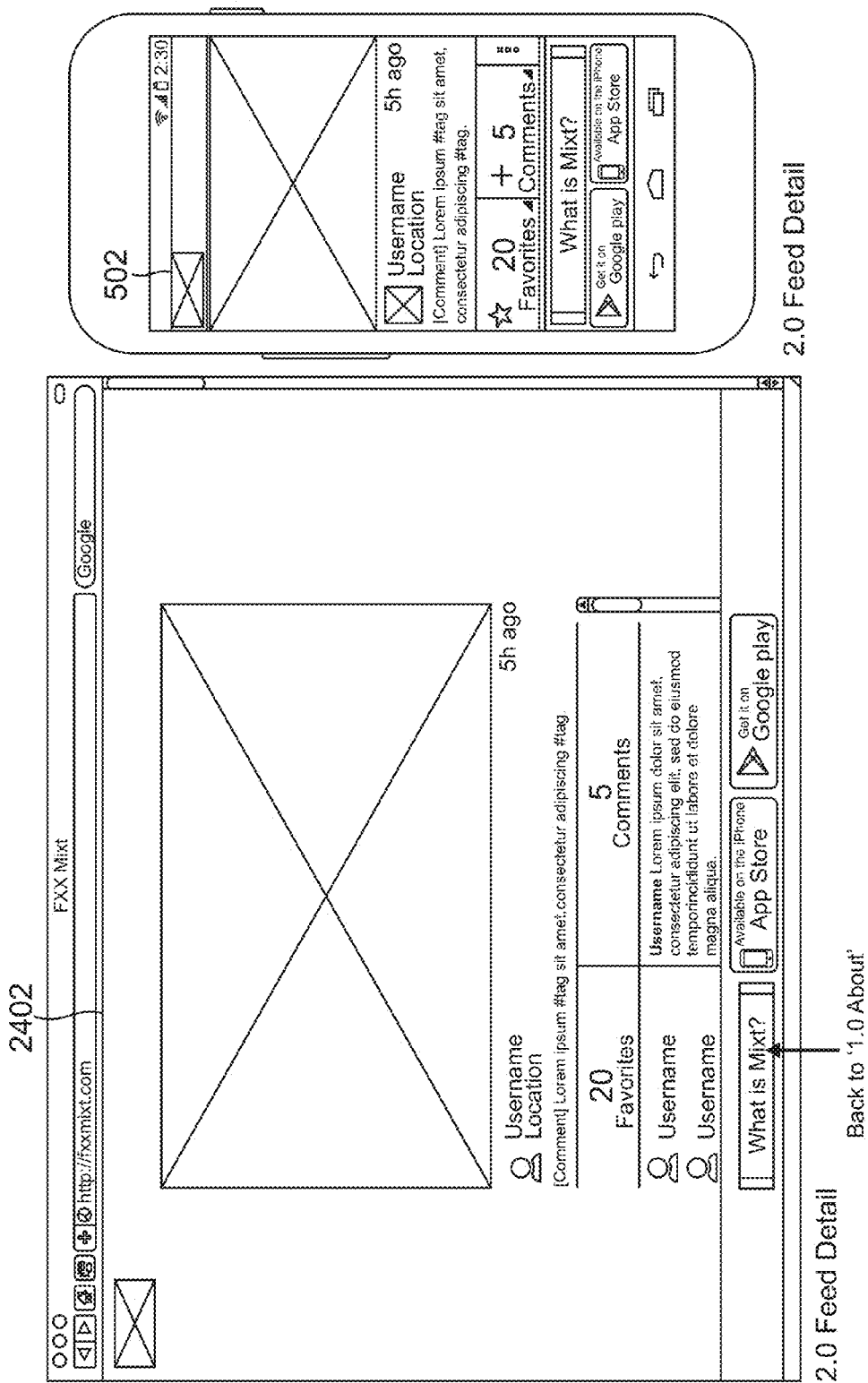
FIG. 24 illustrates an analogous feed screen for presentation within a computer's display using a web browser.

FIG. 24 illustrates an analogous feed screen 2402 for presentation within a computer's display using a web browser.

Retrieval and Management of VAC and VDC

FIG. 2B is a diagram illustrating one embodiment of how the VACAMS 100 may retrieve and manage the generation, presentation and use of the VAC and VDC. It is anticipating that VAC may be submitted at any time to be considered for on-air broadcast, but that such submissions may peak in the times immediately before, during, and immediately after the broadcast of the media program relating to the VAC for on-air submission. Hence, the VACAMS 100 includes a provision for rapidly accepting an reviewing VDC submitted for on-air consideration. In block 250, VDC that was generated from VAC submitted for on-air consideration is queued. This queuing may be performed based on a first-in first-out or FIFO paradigm, or a modified FIFO paradigm. In one embodiment, the metadata provided with or generated from the VAC/VDC is searched to identify VAC/VDC that may be higher priority than other VAC/VAC, either because of the subject matter (as indicated by hashtags or keywords), the time sensitivity, or popularity. For example, as described above, other users who have installed the application on their device 102 (and are hence members of the on-air submission network) are able to view and comment on or "like" the viewer's submissions, even those that have not been broadcast "on-air." The number of likes or the rate at which such submissions are liked by other users in the on-air submission network can also be used to prioritize the queue of VAC/VDC that is submitted for on-air consideration. Such VAC/VDC may be thought to be "trending," "featured," or "popular" as described earlier with respect to screen 410.

In block 252, the queue is retrieved and transmitted to an API 108 for the VACAMS 100, so that the queue can be presented on a display for review. Exemplary embodiments of the display provided by the API 108 are provided below. Using the API 108, a user of the VACAMS 100 may review and manage the VDC queue, including flagging VDC for on-air broadcast, use in a website, or flagging the VDC or comments for abuse, copyright violation or other inappropriateness. In block 256, a request for VDCs of interest that were submitted for on-air broadcast is made to the CMS 114, and in blocks 258 and 260, the CMS 114 and database 118 retrieve the VAC/VDC and associated metadata. In an alternative embodiment, the VAC/VDC be stored on the media server 110 or on a third party server while the metadata is stored in the database 118. The retrieved VAC/VDC and metadata is retrieved and provided to the API 108 for display to the user, as shown in block 262. In block 264, the user requests and/or designates VAC/VDC for broadcast. As further described below, a VAC/VAC may also be selected to appear in a "featured" feed by flagging the VDC (or posts) as "featured." In block 266, the requested VDC along with metadata (and optionally, the VDC associated with the VAC) is provided to the broadcaster for broadcast in conjunction with the media program.

FIG. 25 is a visual representation of the CMS 114 management data stored in the database 118. The entry of this data can be automatically performed by the CMS 114 when received from device 102 applications, and may be changed or managed by a user through a CMS API 108 interface as follows:

Application User Attribute Controls

Feature/Unfeature:

Selection of a "Feature" or "Unfeature" button in the "Application Users" view of the interface commands the CMS API 108 to update the database 118 so that the particular user is marked as "featured" (a "featured" field in the database is set to "1" for featured or "0" for unfeatured.) Posts made by "featured" users are automatically marked as "featured" by the API (setting the post's "featured" key to 1). Featured posts will be selected by the API to be shown in the application's "Featured News Feed," a collection of posts that have been marked as featured. Upon a "feature" or "unfeature" event (clicking feature or unfeature button) in the CMS 114, previous posts in the database made by the user, are not retroactively updated to featured=1 or 0 by the API.

Activate/Inactivate:

Clicking "Inactivate" or "Activate" button in the "Application Users" view of the interface commands the API to update the database by setting the user's "active" field to "1", in the case of "activate" or "0" in the case of inactivate. Users with an "active" field set to "0" in the database are disallowed from making further posts or comments, and their profile is precluded from being selected by the API when retrieving lists of users profiles, or displaying individual profiles.

Post Attribute Controls

Feature/Unfeature:

Clicking the "Feature" or "Unfeature" button in the "Post" view commands the API to update the database 114 so that the subject post is marked as "featured" (a "featured" field in the database is set to "1" for featured or "0" for unfeatured). Posts with a "featured" field set to "1" are selected by the API to be displayed in the "Featured News Feed" of the device 102 applications. A "feature" or "unfeature" event (clicking feature or unfeature button) in the CMS's post view has no effect on other posts made by the same user.

Ban/Remove Ban:

Clicking the "Ban" or "Remove Ban" button the CMS's "Post" view commands the API to update the database by setting the posts "ban" field to "1" or "0", respectively. Posts with a ban field set to "1" in the database are filtered out of all data collected by the API for display in the device 102 application's "User News Feed," "Popular News Fee," and "Recent News Feed"

Download:

Download's the original content uploaded by the app which is stored on the server 106 or a media server.

Comment Controls

Ban/Remove Ban:

Clicking the "Ban" or "Remove Ban" in the CMS's "Comment" view interface tells the API to update the database by setting the comment's "ban" field to "1" or "0", respectively. Comments with a ban field set to "1" in the database are filtered out of all data collected by the API for display in the device 102 application's "Post Details" comments section.

On Air Submissions

The CMS 114 asks the API to retrieve all posts in the database with an "on-air" field set to 1. Users have the choice of marking posts they are willing to have shown in conjunction with the broadcast. When a user uploads a photo or other viewer-authored content they have marked as television eligible, the API sets the post's "on Air" field to "1" when it save the photo's meta data to the database 114.

Abusive Posts/Comments

The CMS 114 asks the API to retrieve all posts/comments in the database 114 with an "abuse-reports-count" field having a value of 1 or greater. When device 102 application users flag a post/comment as "abusive" the CMS 114 receives this information, and the API increments the "abuse-reports-count" field by 1. Posts/comments with an "abuse-reports-count" greater than, or equal to N (5, for example) are filtered out of all posts/comments retrieved from the database by the API for consideration for broadcast.

FAQs/Privacy/Terms

This control submits data for updating/creating FAQ, privacy and terms pages to the API for saving to the database 118. The device 102 application retrieves these pages from the Web as described above.

Exemplary User Interface

Figure 26C:
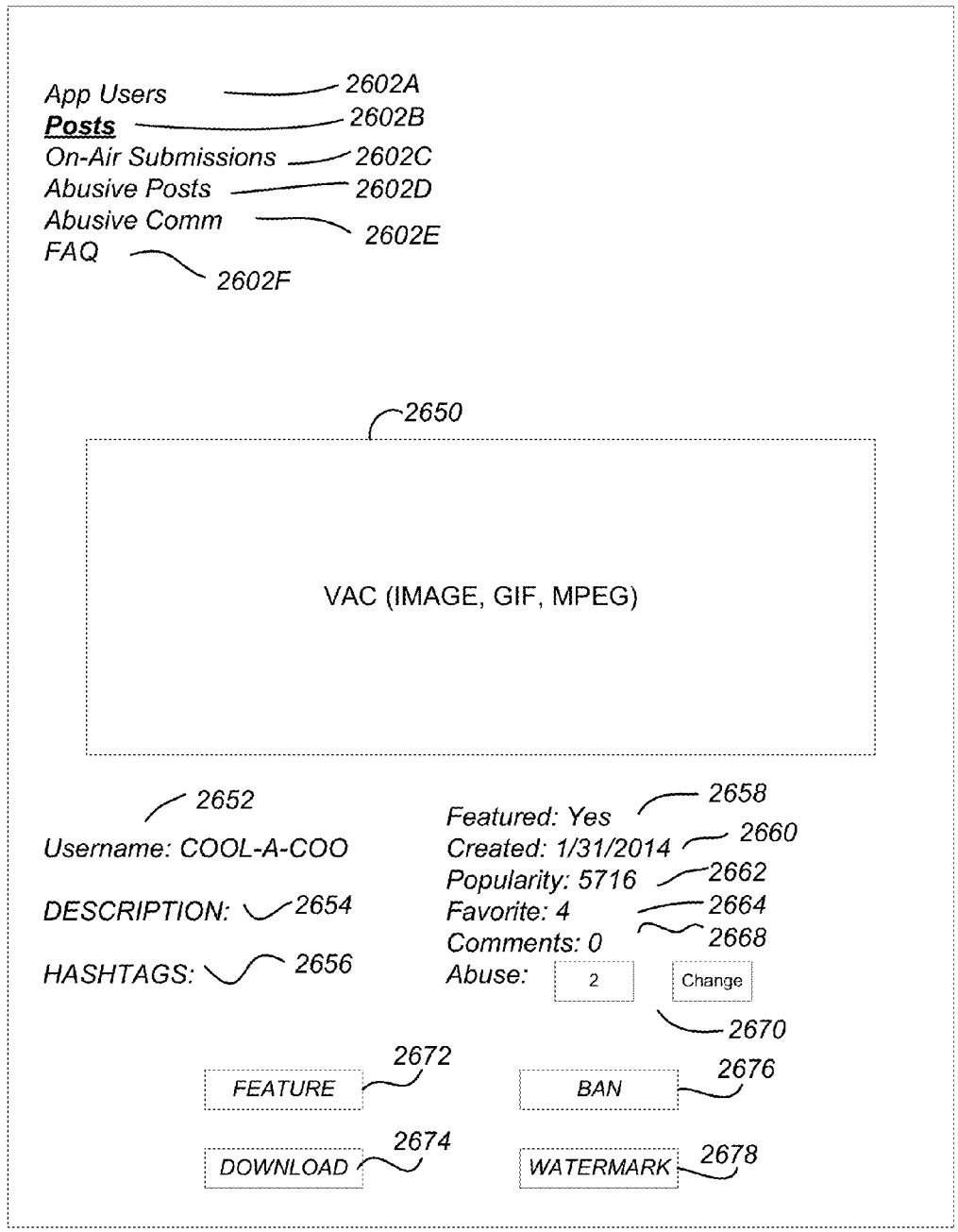

FIGS. 26A-26C are diagrams of an exemplary user interface 2600 implemented by the API 108. The user interface (UI) 2600 may be presented on a display of a communicatively connected computer within the VACAMS 100. The UI 2600 illustrated in FIG. 26A includes a plurality of menu items 2602A-2602F for navigating the interface. In FIG. 26A, the application user interface, (presented in response to the selection of item 2602A) is presented. The UI 2600 includes a plurality of columns 2604-2610, including a first column 2604 providing usernames for the VACAMS 100 users that have registered for the viewer-authored content sharing service. Column 2606 describes the date that the user account for the username was created. Column 2608 describes whether the user is a "featured user" or not, and column 2610 includes controls that allow the user to present a UI of the selected user's profile. Column 2604 also has a control 2604 that allows the user to search for the username by entering characters and wildcards. Usernames matching the search are presented. Column 2606 includes a creation date search control 2606, which allows the user to limit the usernames presented to those associated with accounts created between specified dates. Column 2608 includes a featured control 2608 which, when selected, selects whether all usernames are presented, those which are unfeatured, or those which are featured users. The search parameters associated with controls 2604-2608 can operate in a logical AND fashion with the presented usernames being those satisfying all three constraints. In one embodiment, the information shown in FIG. 26A may be edited by selecting the appropriate column/row combination and editing the information as desired.

FIG. 26B is a diagram illustrating the user interface 2600 presented when the user selects the "posts" menu item 2602B. The user interface 2600 includes a hashtag column 2611 a popularity column 2612, a favorites column 2614, a username column 2616, a featured column 2618, and a creation date column 2620.

The hashtag column 2611 presents an image of the VDC (typically a selected still image) 2622 related to the VDC and any hashtags associated with the VAC. The popularity column 2612 indicates a measure of the popularity 2624 of the VAC. Popularity can be determined by one or more factors including a number of views, a number of likes, favorites, or other factors. The favorites column 2614 indicates the number of users 2626 who have indicated that the VDC is a favorite. Column 2616 indicates the username 2628 of the viewer that provided the VAC that was used to generate the VDC. Column 2618 includes a character 2630 that indicates whether the VDC is a featured VDC that is to be presented in the featured feed. Column 2620 indicates the date 2632 when the VDC was generated or alternately, when the VAC that was used to generate the VDC was provided.

Column 2611 has a control 2634 allowing the user to perform a character search to display hashtags with the combination of characters entered into the control. The popularity column 2612 includes a max/min control 2636 that allows the user to limit the VDC presented in the interface 2600 to VDC that has a popularity measure between the input limits entered into the control. The favorites column 2614 includes a control 2638 that allows the user to limit the VDC that is presented in the UI 2600 to those that are between a maximum and minimum value. The username column 2616 includes a control 2640 that allows the user to limit the VDC shown in the UI 2600 to those associated with usernames that comply with characters entered into the control. The featured column 2618 includes a control 2642 that allows the user to limit the VDC shown in the UI 2600 to VDC that have are not featured or are featured. Finally, the created column 2620 includes a control 2644 that limits those VDC presented in the UI to those created between specified dates entered via the control. In one embodiment, the data and metadata presented in the UI 2600 can be edited by selecting the appropriate row and column, and changing the information. A particular VDC may be selected by selecting the thumbnail image 2622 associated with the VAC. This presents the VDC UI.

FIG. 26C is a diagram illustrating one embodiment of the VDC UI 2650. The VDC UI 2600 includes an image window 2650 in which the VDC is presented. Metadata associated with the VAC, including the username, description, hashtags, feature status, creation date, popularity, favorite status, and number of comments are illustrated in items 2652-2668, which are editable by the user. If the VDC has been the subject of a charge by another user as being abusive, this may be indicated and changed by control 267.

The VDC UI 2650 also includes a feature control 2672, a ban control 2676, a download control 2674, and a watermark control 2678. The feature control can be used to toggle whether the associated VDC is part of the featured feed. The ban control 2676 can be used to ban (remove from distribution to other users) the VDC or the user. Download control 2676 can be used to download the VDC shown in the window 2650 so that it can be provided for broadcast or other disposition. Finally, the watermark control 2678 can be used to watermark the VAC.

FIG. 27 is a diagram illustrating exemplary steps that can be used to automatically collect, manage, and provide viewer-authored media content for consideration for broadcast presentation in conjunction with a live broadcast of a media program. In block 2702, an application is provided for installation on the device 102, wherein the application can be used to generate viewer authored content from a plurality of images. In one embodiment, the device 102 is a cellphone having a camera for collecting the subject images. Also, the application may be dedicated to a particular media program broadcast by the broadcaster (thus making all communications between the device 102 and the VACAMS 100 inherently related to the associated media program) or may be usable with a number of media programs from the same broadcaster, or a plurality of broadcasters.

In block 2704, the VACAMS 100 receives viewer registration information uniquely associated with a viewer via the installed application via the device 102. This information can be received, for example by the application executing in the device 102 and accepting the information into screens 302 and 304 discussed above. If the viewer is already registered, the registration step is unnecessary.

In block 2706, viewer-authored content is received by the VACAMS 100. This can occur at anytime, but preferably occurs during or temporally proximate the live broadcast of the media program that is the subject of or related to the viewer-authored content. The viewer-authored content is received for consideration by the provider of the media program for presentation in conjunction with the live broadcast of the media program. As described above, the viewer providing the viewer-authored content to the VACAMS 100 has typically pre-approved the use and dissemination of the viewer-authored content, for example, by checking the appropriate box in screen 1102 shown in FIG. 11 before sending the content. Typically, the content cannot be sent until they've pre-approved it's dissemination by checking the box. The information transmitted to the VACAMS 100 provides a means by which the identity and contact information of the viewer may be pre-determined (for example, by transmitting a user ID some time during the viewer's session with the VACAMS 100 and associating the user ID with a particular user).

Block 2708 provides the viewer-authored content to a content management system (CMS) 114 further described below. In block 2710, the CMS 114 queues the viewer-authored content with other viewer-authored content from other viewers for consideration for presentation in conjunction with the live broadcast of the media program related to the viewer-authored content. Block 2712 determines if the viewer authored content complies with broadcast regulations. For example, it is typically required that any viewer-authored content used in on-air broadcasts must be manually reviewed to assure that it complies with obscenity regulations, is age appropriate for the media program, and to assure that it does not disparage other viewers, or the media program, broadcaster, or other parties as well.

In block 2714, the viewer authored content is selected for broadcast presentation in conjunction with the live broadcast of the media program. This can occur in a number of different ways. For example, the viewer-authored content can be used as a "bumper" that is aired in short intervals between the media program and advertisements broadcast during the media program. The viewer authored content may be transmitted as a lead in to the media program itself, or used in web-based marketing materials. A commercial break presenting the top five "mimes" of the evening may also be presented, with those top-five "mimes" sponsored by a particular paying sponsor. In another embodiment, viewer-authored content is presented in other viewers' device 102 applications as well. For that matter, the application installed on the device 102 may be sponsored by a paying sponsor.

In one embodiment, the media program referred to above is one of a plurality of episodes of a show, and the show is one of a plurality of shows provided by the media provider, wherein each show has associated editorial standards that are transmitted to the device 102. For example, the media program provider may be FOX, the show may be one of the shows provided by FOX (e.g. THE SIMPSONS) that has associated editorial standards that differ from other FOX shows (e.g. AMERICAN IDOL), and the media program is an episode of THE SIMPSONS. The application executing on the device 102 may be used to provide VAC to the VACAMS 100 for both AMERICAN IDOL and THE SIMPSONS, but editorial standards (e.g. suitability for younger audiences) transmitted to the device 102 for THE SIMPSONS may differ from those of AMERICAN IDOL. The metadata associated with the VAC may include keywords or hashtags describing attributes of the VAC. That information can be sent to the VACAMS 100 to assist in determining if the VAC complies with the editorial standards associated with the show (e.g. THE SIMPSONS), or using instructions executing in the device 102, the device 102 can determine if the VAC complies with the editorial standards of the show associated with the media program. This can be accomplished by comparison of the editorial standards (which may include keywords which indicate that the VAC does not comply) and the keywords in the metadata. VAC not complying with the editorial standards may be nonetheless transmitted from the device 102 to the VACAMS 100, or such transmission may be prevented.

As described above, the VAC may comprise a plurality of independent media files (e.g. JPEGs or TIFFs, with each file comprising an intra-compressed image. Intra-compressed images are images that do not depend upon other images for information used in the decompression process. For example, one JPEG does not typically require reference to another JPEG to permit decompression. An example of an image that is not only intra-compressed is an MPEG frame. MPEG frames include I frames (which are only intra-compressed) and do not require information from other frames for decompression, and P (predictive) and B predictive) frames in which decompression and decoding of the frame requires information from other frames. The plurality of independent media files may be compressed (e.g. by a ZIP utility) to produce an archive file of the JPEGs). After the ZIP file is decompressed, an animated image file (GIF) maybe created from the independent files, then a compressed video file such an MPEG, MP3, QUICKTIME, or other file is created from the GIF, thus mimicking the animated image provided when the GIF file is executed. This compressed video file acts as a proxy for the GIF file.

Hardware Environment

Figure 28:
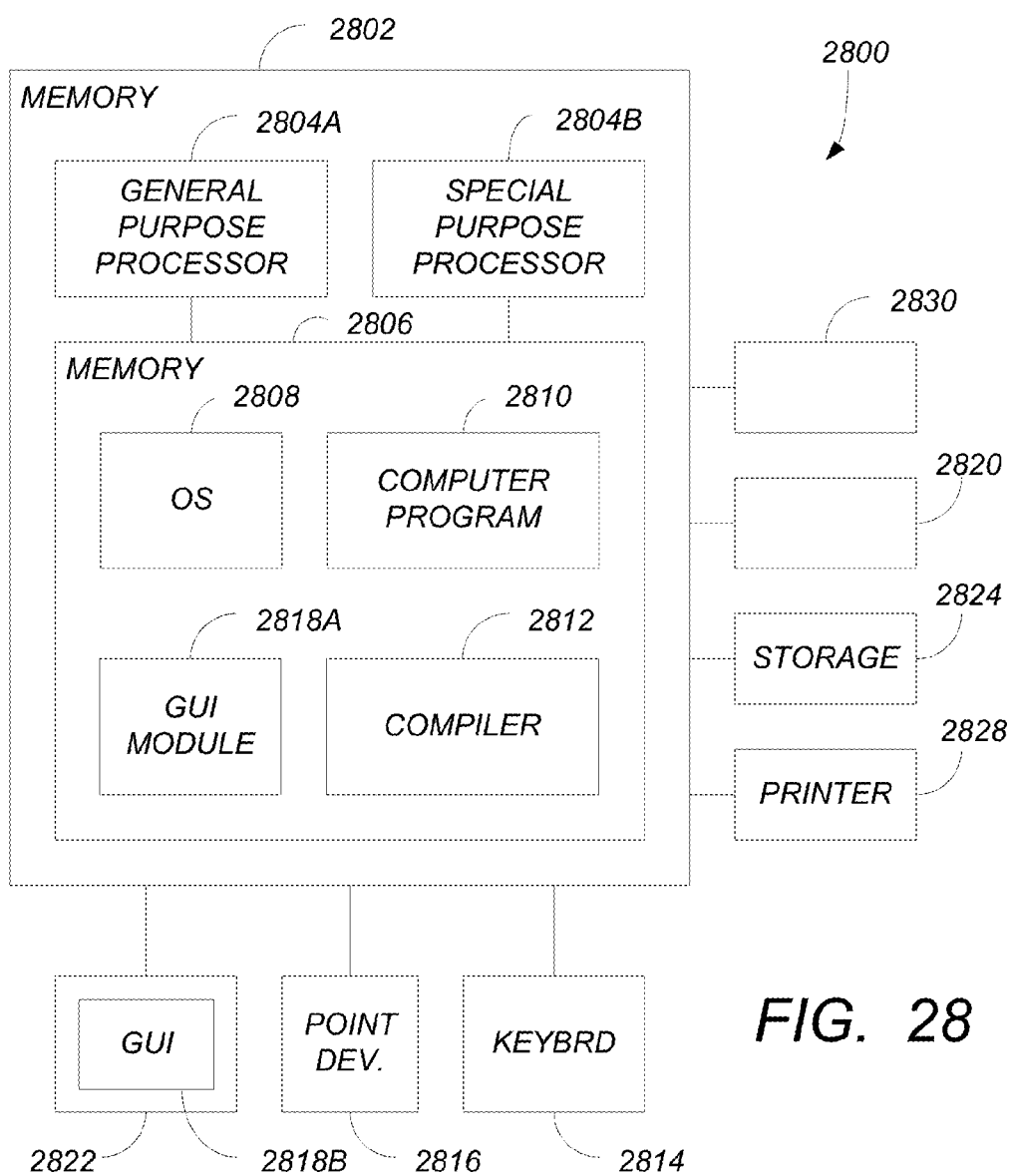
FIG. 28 is a diagram illustrating an exemplary computer system that could be used to implement elements of the system.

FIG. 28 is a diagram illustrating an exemplary computer system 2800 that could be used to implement elements of the system. The computer 2802 comprises a general purpose hardware processor 2804A and/or a special purpose hardware processor 2804B (hereinafter alternatively collectively referred to as processor 2804) and a memory 2806; such as random access memory (RAM). The computer 2802 may be coupled to other devices, including input/output (I/O) devices such as a keyboard 2814, a mouse device 2816 and a printer 2828.

In one embodiment, the computer 2802 operates by the general purpose processor 2804A performing instructions defined by the computer program 2810 under control of an operating system 2808. The computer program 2810 and/or the operating system 2808 may be stored in the memory 2806 and may interface with the user and/or other devices to accept input and commands and, based on such input and commands and the instructions defined by the computer program 2810 and operating system 2808 to provide output and results.

Output/results may be presented on the display 2822 or provided to another device for presentation or further processing or action. In one embodiment, the display 2822 comprises a liquid crystal display (LCD) having a plurality of separately addressable pixels formed by liquid crystals. Each pixel of the display 2822 changes to an opaque or translucent state to form a part of the image on the display in response to the data or information generated by the processor 2804 from the application of the instructions of the computer program 2810 and/or operating system 2808 to the input and commands. Other display 2822 types also include picture elements that change state in order to create the image presented on the display 2822. The image may be provided through a graphical user interface (GUI) module 2818A. Although the GUI module 2818A is depicted as a separate module, the instructions performing the GUI functions can be resident or distributed in the operating system 2808, the computer program 2810, or implemented with special purpose memory and processors.

Some or all of the operations performed by the computer 2802 according to the computer program 2810 instructions may be implemented in a special purpose processor 2804B. In this embodiment, some or all of the computer program 2810 instructions may be implemented via firmware instructions stored in a read only memory (ROM), a programmable read only memory (PROM) or flash memory within the special purpose processor 2804B or in memory 2806. The special purpose processor 2804B may also be hardwired through circuit design to perform some or all of the operations to implement the present invention. Further, the special purpose processor 2804B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 2802 may also implement a compiler 2812 which allows an application program 2810 written in a programming language such as COBOL, C++, FORTRAN, or other language to be translated into processor 2804 readable code. After completion, the application or computer program 2810 accesses and manipulates data accepted from I/O devices and stored in the memory 2806 of the computer 2802 using the relationships and logic that was generated using the compiler 2812.

The computer 2802 also optionally comprises an external communication device such as a modem, satellite link, Ethernet card, or other device for accepting input from and providing output to other computers.

In one embodiment, instructions implementing the operating system 2808, the computer program 2810, and/or the compiler 2812 are tangibly embodied in a computer-readable medium, e.g., data storage device 2820, which could include one or more fixed or removable data storage devices, such as a zip drive, floppy disc drive 2824, hard drive, CD-ROM drive, tape drive, or a flash drive. Further, the operating system 2808 and the computer program 2810 are comprised of computer program instructions which, when accessed, read and executed by the computer 2802, causes the computer 2802 to perform the steps necessary to implement and/or use the present invention or to load the program of instructions into a memory, thus creating a special purpose data structure causing the computer to operate as a specially programmed computer executing the method steps described herein. Computer program 2810 and/or operating instructions may also be tangibly embodied in memory 2806 and/or data communications devices 2830, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 2802.

Although the term "computer" is referred to herein, it is understood that the computer may include portable devices such as smartphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for providing viewer-derived content for broadcast presentation in conjunction with a broadcast of a media program by a provider of the media program, comprising:
    (a) receiving viewer registration information uniquely associated with a viewer via an application executing on a viewer device, the application for collecting the viewer registration information, viewer-authored content and viewer-authored content metadata associated with the viewer-authored content;
    (b) receiving the viewer-authored content and the viewer-authored content metadata in a content management system (CMS);
    (c) processing the viewer authored content according to the viewer authored metadata to generate the viewer-derived content;
    (d) queuing the viewer-derived content with other viewer-derived content generated from viewer-authored content from other viewers for consideration for the broadcast presentation in conjunction with the broadcast of the media program;
    (e) determining if the viewer-derived content complies with broadcast regulations or quality standards;
    (f) selecting the viewer-derived content for broadcast presentation in conjunction with the live broadcast of the media program if the viewer-derived content complies with the broadcast regulations or the quality standards; and (g) providing the viewer-derived content for broadcast in conjunction with the live broadcast of the media program;

wherein the viewer is one of a plurality of viewers and the CMS manages a database of a plurality of attributes relating to each of the plurality of viewers submitting viewer-authored content via a respective plurality of viewer devices, and wherein:

each of the plurality of viewers is associated with a first set of the plurality of attributes including:
- a viewer active attribute, indicating whether the associated viewer is disallowed from making future posts or comments, and precluding selection of any viewer-authored content from the associated viewer for broadcast presentation;
- a viewer feature attribute, indicating whether a post from the associated viewer is to be included in a featured viewer post news feed; and
- wherein each of the first set of the plurality of attributes is selectable to manage the broadcasting of the viewer-derived content associated with the viewer-authored media content;

each of the plurality of viewers is associated with a viewer post having an associated second set of the plurality of attributes, including:
- a viewer post active attribute, indicating whether the associated viewer post is disallowed from selection for the featured viewer post news feed transmitted to the plurality of viewer devices;
- a viewer post feature attribute indicating whether the associated viewer post is to be included in the featured viewer post news feed;
- a viewer post ban attribute indicating whether the associated viewer post is to be banned from inclusion into the featured viewer post news feed, a viewer news feed, a popular news feed and a recent news feed;
- a viewer post download content attribute indicating that the viewer-authored media content associated with the viewer post is to be uploaded for broadcast presentation;
- an abusive viewer post attribute, counting a number reports that the viewer post associated with the attribute has been flagged by other viewers as abusive; and
- a viewer post on-air attribute, selectable by the viewer authoring the viewer post, indicating the associated viewer post may be shared;
- wherein each of the second set of the plurality of attributes is selectable by the CMS to manage the provision of the viewer-authored media content; and each of the comments from each viewer are associated with a third set of the plurality of attributes, including:
- a viewer comment on-air attribute, selectable by the viewer authoring the viewer post, indicating that the associated viewer comment may be shared; and
- a viewer comment ban attribute indicating whether the associated viewer comment is to be banned from inclusion among comments to the associated viewer post.

2. The method of claim 1, further comprising:
providing the application for installation on the viewer device before performing (a)-(g), wherein the application is configured to generate the viewer-authored content according to the quality standards.

3. The method of claim 2, wherein:
the media program is one of a plurality of episodes of a show, the show being one of a plurality of shows provided by the media provider, each show having associated editorial standards transmitted to the viewer device;
the viewer authored metadata comprises keywords describing attributes of the viewer authored content; and
the method further comprises:
- determining, in the viewer device, if the viewer authored content complies with the editorial standards of the show associated with the media program by comparison of the keywords with the editorial standards;
- performing steps (c)-(g) only if the viewer authored content complies with the editorial standards using an editorial standards module executing on the viewer device.

4. The method of claim 1, wherein:
the viewer authored content comprises a plurality of independent media files, each media file comprising an intra-compressed image;
the step of processing the viewer authored content according to the viewer authored metadata to generate the viewer derived content comprises the steps of:
- generating an animated image file from the plurality of independent media files; and
- generating a compressed video file from the plurality of independent media files, the compressed video file mimicking and serving as a proxy for the animated image file.

5. The method of claim 4, wherein:
the viewer-authored content comprises a compressed archive file having the plurality of independent media files; and
the method further comprises the step of decompressing the compressed archive file to recover the independent media files.

6. The method of claim 4, further comprising the step of:
transmitting the compressed video file to the viewer device for presentation by the application executing on the viewer device.

7. The method of claim 4, wherein:
the viewer-authored metadata includes permission to broadcast the viewer-derived content associated with the viewer-authored content; and
the viewer authored media is processed only when the viewer authored metadata includes the permission to broadcast the viewer-derived content.

8. The method of claim 4, wherein:
the viewer-authored metadata includes permission to broadcast the viewer-derived content; and
the viewer authored content is processed regardless of whether the authored metadata includes the permission to broadcast the viewer-derived content associated with the viewer-derived content, but is not broadcast without permission to broadcast the viewer-derived content.

9. The method of claim 1, wherein the viewer registration information includes information uniquely identifying the user, comprising:
information sufficient to confirm viewer competency to enter agreement for the broadcast presentation of the viewer-derived content;
viewer contact information; and
viewer geographical location.

10. The method of claim 1, further comprising:
automatically verifying at least a portion of the information associated with received viewer-authored content by comparison with verifying information of a source independent from the user registration information.

11. The method of claim 1, wherein:
the method further comprises transmitting the viewer-derived content to a social network; and
the step of selecting the viewer-derived content for broadcast presentation is automatically based at least in part on assessment data from users of the social network regarding the viewer authored content transmitted to the social network.

12. The method of claim 1, wherein:
the viewer-authored media metadata comprises an indication to share the viewer-derived content associated with the viewer-authored content on a plurality of social networks;
the method further comprises the steps of:
hosting the viewer-derived content on a server accessible according to a uniform resource locator unique to the viewer-derived content;
providing the uniform resource locator to each of the plurality of social networks.

13. The method of claim 1, wherein the viewer registration information comprises viewer contact information, and method further comprises step of:
transmitting a message to the viewer device according to the user contact to confirm viewer approval of broadcast of the viewer-derived content associated with the viewer-authored content.

14. An apparatus for providing viewer-authored content for broadcast presentation in conjunction with a broadcast of a media program by a provider of the media program comprising:
a processor;
a memory, coupled to the processor, the memory storing a plurality of instructions comprising instructions for:
(a) receiving viewer registration information uniquely associated with a viewer via an application executing on a viewer device, the application for collecting the viewer registration information, viewer-authored content and viewer-authored content metadata associated with the viewer-authored content;
(b) receiving the viewer-authored content and the viewer-authored content metadata in a content management system (CMS);
(c) processing the viewer authored content according to the viewer authored content metadata to generate the viewer-derived content;
(d) queuing the viewer-derived content with other viewer-derived content from other viewers for consideration for the broadcast presentation in conjunction with the broadcast of the media program;
(e) accepting a determination of whether the viewer-derived content complies with broadcast regulations or quality standards;
(f) accepting a selection of the viewer-derived content for broadcast presentation in conjunction with the live broadcast of the media program if the viewer-derived content complies with the broadcast regulations or the quality standards; and
(g) providing the viewer-derived content in conjunction with the live broadcast of the media program for broadcast;
wherein the viewer is one of a plurality of viewers and the CMS manages a database of a plurality of attributes relating to each of the plurality of viewers submitting viewer-authored content via a respective plurality of viewer devices, and wherein:
each of the plurality of viewers is associated with a first set of the plurality of attributes including:
a viewer active attribute, indicating whether the associated viewer is disallowed from making future posts or comments, and precluding selection of any viewer-authored content from the associated viewer for broadcast presentation;
a viewer feature attribute, indicating whether a post from the associated viewer is to be included in a featured viewer post news feed; and
wherein each of the first set of the plurality of attributes is selectable to manage the broadcasting of the viewer-authored media content;
each of the plurality of viewers is associated with a viewer post having an associated second set of the plurality of attributes, including:
a viewer post active attribute, indicating whether the associated viewer post is disallowed from selection for the featured viewer post news feed transmitted to the plurality of viewer devices;
a viewer post feature attribute indicating whether the associated viewer post is to be included in the featured viewer post news feed;
a viewer post ban attribute indicating whether the associated viewer post is to be banned from inclusion into the featured viewer post news feed, a viewer news feed, a popular news feed and a recent news feed;
a viewer post download content attribute indicating that the viewer-authored media content associated with the viewer post is to be uploaded for broadcast presentation;
an abusive viewer post attribute, counting a number reports that the viewer post associated with the attribute has been flagged by other viewers as abusive; and
a viewer post on-air attribute, selectable by the viewer authoring the viewer post, indicating the associated viewer post may be shared;
wherein each of the second set of the plurality of attributes is selectable by the CMS to manage the provision of the viewer-authored media content; and
each of the comments from each viewer are associated with a third set of the plurality of attributes, including:
a viewer comment on-air attribute, selectable by the viewer authoring the viewer post, indicating that the associated viewer comment may be shared; and
a viewer comment ban attribute indicating whether the associated viewer comment is to be banned from inclusion among comments to the associated viewer post.

15. The apparatus of claim 14, wherein the instructions further comprise instructions for:
providing the application for installation on the viewer device before performing (a)-(g), wherein the application is configured to generate the viewer-authored content according to the quality standards.

16. The apparatus of claim 15, wherein:
the media program is one of a plurality of episodes of a show, the show being one of a plurality of shows provided by the media provider, each show having associated editorial standards transmitted to the media device;
the viewer authored content metadata comprises keywords describing attributes of the viewer authored content; and
the instructions further comprise instructions for:
determining, in the viewer device, if the viewer authored content complies with the editorial standards of the show associated with the media program by comparison of the keywords with the editorial standards;

performing steps (c)-(g) only if the viewer authored content complies with the editorial standards using an editorial standards module executing on the viewer device.

17. The apparatus of claim 14, wherein:
the viewer authored media comprises a plurality of independent media files, each media file comprising an intra-compressed image;
the instructions for processing the viewer authored content according to the viewer authored content metadata to generate the viewer-derived content comprises instructions for:
generating an animated image file from the plurality of independent media files; and
generating a compressed video file from the plurality of independent media files, the compressed video file mimicking the animated image file.

18. The apparatus of claim 17, wherein:
the viewer-authored content comprises a compressed archive file having the plurality of independent media files; and
the instructions further comprise instructions for decompressing the compressed archive file to recover the independent media files.

19. The apparatus of claim 17, wherein the instruction further comprise instructions for:
transmitting the compressed video file to the viewer device for presentation by the application executing on the viewer device.

20. The apparatus of claim 17, wherein:
the viewer-authored content metadata includes permission to broadcast the viewer-authored content or viewer-derived content; and
the viewer authored media is processed only when the viewer authored metadata includes the permission to broadcast the viewer-authored content or viewer-derived content.

21. The apparatus of claim 17, wherein:
the viewer-authored metadata includes permission to broadcast the viewer-authored content or viewer-derived content; and
the viewer authored media is processed regardless of whether the authored metadata includes the permission to broadcast the viewer-authored content or the viewer derived content, but is not broadcast without permission to broadcast the viewer-authored content or the viewer-derived content.

22. The apparatus of claim 14, wherein the viewer registration information includes information uniquely identifying the user, comprising:
information sufficient to confirm viewer competency to enter agreement for the broadcast presentation of the viewer-derived content;
viewer contact information; and
viewer geographical location.

23. The apparatus of claim 14, wherein the instructions further comprise instructions for:
automatically verifying at least a portion of the information associated with received viewer-authored content by comparison with verifying information of a source independent from the user registration information.

24. The apparatus of claim 14, wherein:
the instructions further comprise instructions for transmitting the viewer-authored content or viewer-derived content to a social network; and
the instructions for selecting the viewer-derived content for broadcast presentation automatically select the viewer-derived content for broadcast presentation based at least in part on assessment data from users of the social network regarding the viewer authored content transmitted to the social network.

25. The apparatus of claim 14, wherein:
the viewer-authored content metadata comprises an indication to share the viewer-authored content or viewer-derived content on a plurality of social networks;
the instructions further comprises instructions for:
hosting the viewer-derived content on a server accessible according to a uniform resource locator unique to the viewer-derived content;
providing the uniform resource locator to each of the plurality of social networks.

26. The apparatus of claim 14, wherein the viewer registration information comprises viewer contact information, and instructions further comprise instructions for:
transmitting a message to the viewer device according to the user contact to confirm viewer approval of broadcast of viewer-derived content.

27. A system for providing viewer-authored content for broadcast presentation in conjunction with a broadcast of a media program by a provider of the media program comprising:
a viewer device, comprising
a viewer device processor;
a viewer device memory, communicatively coupled to the processor;
a viewer authored content acquisition and management system (VACAMS) comprising:
a VACAMS processor;
a VACAMS memory, coupled to the VACAMS processor, the memory storing a plurality of instructions comprising instructions for:
(a) receiving viewer registration information uniquely associated with a viewer via an application stored in the viewer device memory and executing on the viewer device processor, the application for collecting the viewer registration information, viewer-authored content and viewer-authored content metadata associated with the viewer-authored content;
(b) receiving the viewer-authored content and the viewer-authored content metadata in a content management system (CMS) of the VACAMS;
(c) processing the viewer authored content according to the viewer authored content metadata to generate the viewer-derived content;
(d) queuing the viewer-derived content with other viewer-derived content derived from viewer-authored content from other viewers for consideration for the broadcast presentation in conjunction with the broadcast of the media program;
(e) accepting a determination of whether the viewer-derived content complies with broadcast regulations or quality standards;
(f) accepting a selection of the viewer-derived content for broadcast presentation in conjunction with the live broadcast of the media program if the viewer-derived content complies with the broadcast regulations or the quality standards; and
(g) providing the viewer-derived content in conjunction with the live broadcast of the media program for broadcast;
wherein the viewer is one of a plurality of viewers and the CMS manages a database of a plurality of attributes relating to each of the plurality of viewers submitting viewer-authored content via a respective plurality of viewer devices, and wherein:

each of the plurality of viewers is associated with a first set of the pluarlity of attributes including:
- a viewer active attribute, indicating whether the associated viewer is disallowed from making future posts or comments, and precluding selection of any viewer-authored content from the associated viewer for broadcast presentation;
- a viewer feature attribute, indicating whether a post from the associated viewer is to be included in a featured viewer post news feed; and
- wherein each of the first set of the pluarlity of attributes is selectable to manage the broadcasting of the viewer-authored media content;

each of the plurality of viewers is associated with a viewer post having an associated second set of the pluarlity of attributes, including:
- a viewer post active attribute, indicating whether the associated viewer post is disallowed from selection for the featured viewer post news feed transmitted to the plurality of viewer devices;
- a viewer post feature attribute indicating whether the associated viewer post is to be included in the featured viewer post news feed;
- a viewer post ban attribute indicating whether the associated viewer post is to be banned from inclusion into the featured viewer post news feed, a viewer news feed, a popular news feed and a recent news feed;
- a viewer post download content attribute indicating that the viewer-authored media content associated with the viewer post is to be uploaded for broadcast presentation;
- an abusive viewer post attribute, counting a number reports that the viewer post associated with the attribute has been flagged by other viewers as abusive; and
- a viewer post on-air attribute, selectable by the viewer authoring the viewer post, indicating the associated viewer post may be shared;
- wherein each of the second set of the pluarlity of attributes is selectable by the CMS to manage the provision of the viewer-authored media content; and each of the comments from each viewer are associated with a third set of the pluarlity of attributes, including:
- a viewer comment on-air attribute, selectable by the viewer authoring the viewer post, indicating that the associated viewer comment may be shared; and
- a viewer comment ban attribute indicating whether the associated viewer comment is to be banned from inclusion among comments to the associated viewer post.

* * * * *